(12) United States Patent
Hiraki et al.

(10) Patent No.: US 7,948,709 B2
(45) Date of Patent: May 24, 2011

(54) THIN-FILM MAGNETIC HEAD

(75) Inventors: Tetsuya Hiraki, Tokyo (JP); Hirotaka Gomi, Tokyo (JP); Kazuhiko Maejima, Tokyo (JP)

(73) Assignee: TDK Corporation, Tokyo (JP)

( * ) Notice: Subject to any disclaimer, the term of this patent is extended or adjusted under 35 U.S.C. 154(b) by 924 days.

(21) Appl. No.: 11/898,324

(22) Filed: Sep. 11, 2007

(65) Prior Publication Data

US 2008/0158735 A1    Jul. 3, 2008

(30) Foreign Application Priority Data

Dec. 28, 2006  (JP) ................................. 2006-355548

(51) Int. Cl.
*G11B 5/17* (2006.01)
*G11B 5/31* (2006.01)
(52) U.S. Cl. ................................. 360/123.2; 360/123.16
(58) Field of Classification Search ............. 360/123.01, 360/123.09, 123.16, 123.25–123.34, 123.46–123.55, 360/123.2, 123.08
See application file for complete search history.

(56) References Cited

U.S. PATENT DOCUMENTS

| | | | | |
|---|---|---|---|---|
| 6,507,455 B1 * | 1/2003 | Kikuiri et al. | ............... | 360/123.2 |
| 6,515,825 B1 * | 2/2003 | Sato | ............... | 360/125.43 |
| 6,721,130 B2 * | 4/2004 | Kobayashi et al. | ............... | 360/123.39 |
| 7,062,839 B2 * | 6/2006 | Sasaki et al. | ............... | 29/603.15 |
| 7,526,857 B2 * | 5/2009 | Sasaki et al. | ............... | 29/603.24 |
| 2001/0009488 A1 * | 7/2001 | Sato | ............... | 360/126 |
| 2002/0044379 A1 * | 4/2002 | Kobayashi et al. | ............... | 360/126 |
| 2002/0054460 A1 * | 5/2002 | Takahashi et al. | ............... | 360/313 |
| 2002/0057526 A1 * | 5/2002 | Sasaki | ............... | 360/126 |
| 2005/0047015 A1 * | 3/2005 | Matono et al. | ............... | 360/126 |
| 2005/0073773 A1 * | 4/2005 | Sasaki et al. | ............... | 360/126 |
| 2006/0012916 A1 * | 1/2006 | Sasaki et al. | ............... | 360/126 |

FOREIGN PATENT DOCUMENTS

| | | |
|---|---|---|
| JP | A 55-84020 | 6/1980 |
| JP | A 2000-268321 | 9/2000 |
| JP | A 2001-216611 | 8/2001 |
| JP | A 2004-134039 | 4/2004 |
| JP | 2004234813 A * | 8/2004 |

OTHER PUBLICATIONS

English-machine translation of Sasaki et al. (JP 2004-234813 A), published on Aug. 19, 2004.*

* cited by examiner

*Primary Examiner* — William J Klimowicz
(74) *Attorney, Agent, or Firm* — Oliff & Berridge, PLC

(57) ABSTRACT

The thin-film magnetic head comprises a lower magnetic pole layer, an upper magnetic pole layer and a first thin-film coil. A resist film made of an organic insulating material is interposed between turns adjacent to each other in the lead constituting the first thin-film coil. The first thin-film coil has a minimum width part and a maximum width part. The minimum width part is arranged closer to an air bearing surface than is a second upper magnetic pole part, while the whole upper face of the minimum width part is covered with the resist film. The maximum width part is arranged on the side farther from the air bearing surface than is the second upper magnetic pole part, while the upper face of the maximum width part is formed with a resist-uncoated area free of the resist film.

5 Claims, 20 Drawing Sheets

Fig.11

| | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 1-8 | EXAMPLE 1-9 | COMPARATIVE EXAMPLE 1-1 | COMPARATIVE EXAMPLE 1-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NEARLY NO | NEARLY NO | NEARLY NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | NO | NO | NO | NO | NO | NO | NO | NO | NO | NO | NO |
| EVALUATION RESULT | B | B | B | A | A | A | B | B | B | C | C |

Fig.12

| | EXAMPLE 2-1 | EXAMPLE 2-2 | EXAMPLE 2-3 | EXAMPLE 2-4 | EXAMPLE 2-5 | EXAMPLE 2-6 | EXAMPLE 2-7 | EXAMPLE 2-8 | EXAMPLE 2-9 | COMPARATIVE EXAMPLE 2-1 | COMPARATIVE EXAMPLE 2-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NO | NEARLY NO | NEARLY NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | NO | NO | NO | NO | NO | NO | NO | NO | NO | NO | NO |
| EVALUATION RESULT | B | B | B | A | A | A | A | B | B | C | C |

Fig.13

| | EXAMPLE 3-1 | EXAMPLE 3-2 | EXAMPLE 3-3 | EXAMPLE 3-4 | EXAMPLE 3-5 | EXAMPLE 3-6 | EXAMPLE 3-7 | EXAMPLE 3-8 | EXAMPLE 3-9 | COMPARATIVE EXAMPLE 3-1 | COMPARATIVE EXAMPLE 3-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NO | NO | NEARLY NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | SOME | SOME | SOME | SOME | SOME | SOME | SOME | SOME | SOME | SOME | SOME |
| EVALUATION RESULT | B | B | B | B | B | B | B | B | B | C | C |

Fig.14

| | EXAMPLE 4-1 | EXAMPLE 4-2 | EXAMPLE 4-3 | EXAMPLE 4-4 | EXAMPLE 4-5 | EXAMPLE 4-6 | EXAMPLE 4-7 | EXAMPLE 4-8 | EXAMPLE 4-9 | COMPARATIVE EXAMPLE 4-1 | COMPARATIVE EXAMPLE 4-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NO | NO | NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | SOME | SOME | SOME | SOME | SOME | SOME | SOME | SOME | SOME | SOME | SOME |
| EVALUATION RESULT | B | B | B | B | B | B | B | B | B | C | C |

Fig.15

|  | EXAMPLE 5-1 | EXAMPLE 5-2 | EXAMPLE 5-3 | EXAMPLE 5-4 | EXAMPLE 5-5 | EXAMPLE 5-6 | EXAMPLE 5-7 | EXAMPLE 5-8 | EXAMPLE 5-9 | COMPARATIVE EXAMPLE 5-1 | COMPARATIVE EXAMPLE 5-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NEARLY NO | NEARLY NO | NEARLY NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | NO | NO | NO | NO | NO | NO | NO | NO | NO | NO | NO |
| EVALUATION RESULT | B | B | B | A | A | A | B | B | B | C | C |

Fig.16

| | EXAMPLE 6-1 | EXAMPLE 6-2 | EXAMPLE 6-3 | EXAMPLE 6-4 | EXAMPLE 6-5 | EXAMPLE 6-6 | EXAMPLE 6-7 | EXAMPLE 6-8 | EXAMPLE 6-9 | COMPARATIVE EXAMPLE 6-1 | COMPARATIVE EXAMPLE 6-2 |
|---|---|---|---|---|---|---|---|---|---|---|---|
| RESIST COATING | X=0.1 | X=0.2 | X=0.3 | X=0.4 | X=0.5 | X=0.6 | X=0.7 | X=0.8 | X=0.9 | TOTALLY EXPOSED | TOTALLY COATED |
| PEELING | NO | NO | NO | NO | NO | NO | NEARLY NO | NEARLY NO | NEARLY NO | NO | YES |
| RESISTANCE VALUE RISING RATE OF THIN-FILM COIL [%] | 7.5 | 6.0 | 4.5 | 3.5 | 2.5 | 2.0 | 1.5 | 0.8 | 0.3 | 9.5 | 0.0 |
| CRACK | NO | NO | NO | NO | NO | NO | NO | NO | NO | NO | NO |
| EVALUATION RESULT | B | B | B | A | A | A | B | B | B | C | C |

Fig.17
(a)
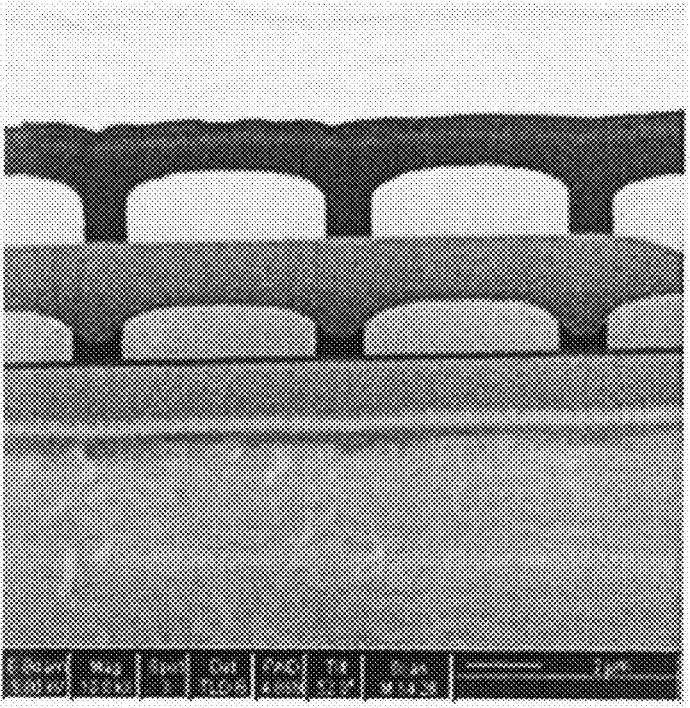
(b)
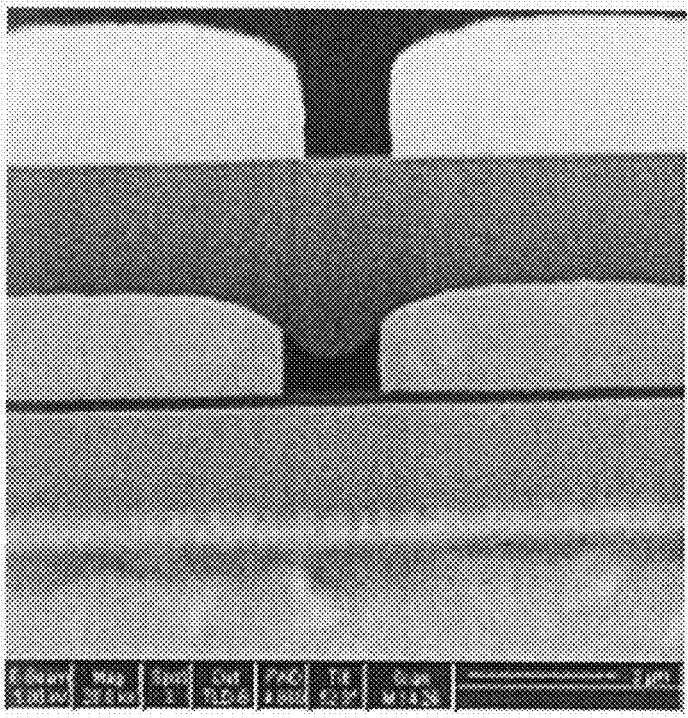

*Fig.18*
(a)
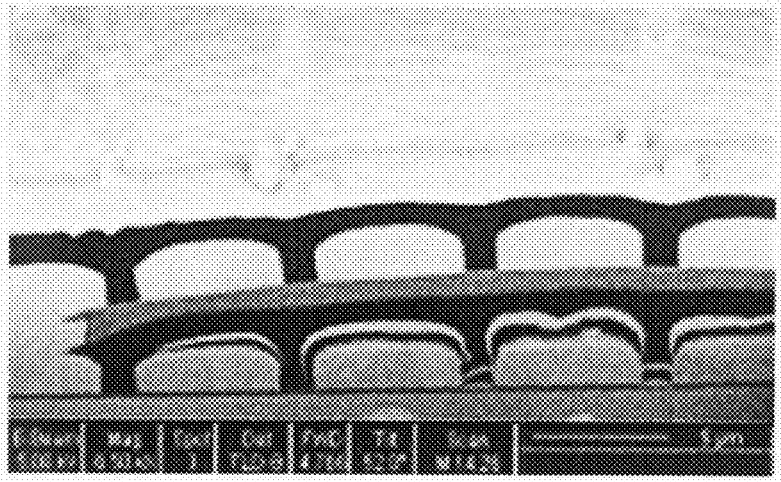
(b)
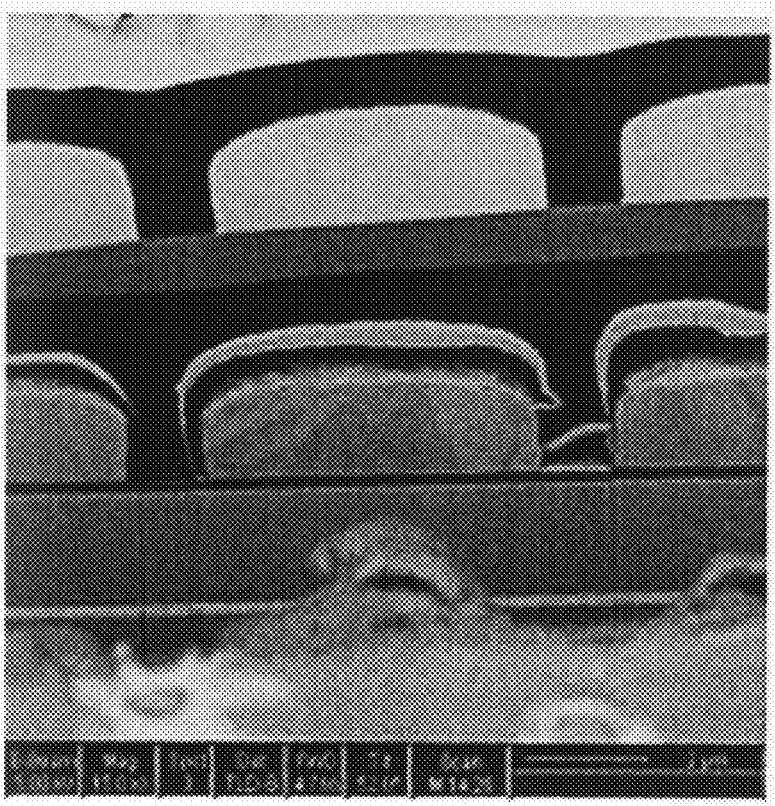

THIN-FILM MAGNETIC HEAD

BACKGROUND OF THE INVENTION

1. Field of the Invention

The present invention relates to a thin-film magnetic head.

2. Related Background Art

A thin-film magnetic head in which the whole upper face of a lead constituting a thin-film coil is covered with an organic insulating material has conventionally been known (see, for example, Japanese Patent Application Laid-Open No. 2000-268321).

Also, a thin-film magnetic head in which an organic insulating material is interposed between turns adjacent to each other in a lead constituting a thin-film coil, while an inorganic insulating material is in contact with the upper and lower faces of the lead in the laminating direction has conventionally been known (see, for example, Japanese Patent Application Laid-Open No. 2004-134039).

SUMMARY OF THE INVENTION

A thermal load or the like in a later step generates a stress in the organic insulating material, whereas the magnitude of the stress is in proportion to the volume of the organic insulating material. Therefore, in the thin-film magnetic head described in Japanese Patent Application Laid-Open No. 2000-268321, the organic insulating material is likely to peel off in particular in the upper face of a part where the width of the lead is relatively large in the lead constituting the thin-film coil when seen from the upper side in the laminating direction. For preventing the organic insulating material from peeling off, the organic insulating material may be interposed only between turns adjacent to each other in the lead constituting the thin-film coil as in the thin-film magnetic head described in Japanese Patent Application Laid-Open No. 2004-134039.

Meanwhile, manufacturing a thin-film magnetic head requires the steps of forming an organic insulating material such that the organic insulating material is interposed between turns adjacent to each other in a lead constituting a thin-film coil, and then slightly milling the whole surface of a substrate (wafer) so as to clean the wafer surface in order to improve the adhesion to an inorganic insulating material such as $Al_2O_3$ which will be formed later. If the lead constituting the thin-film coil is exposed at the upper face in the laminating direction here, the lead will be slightly milled, so as to reduce its cross-sectional area, thereby increasing the resistance value of the thin-film coil, while fluctuating the inductance of the thin-film coil.

In the thin-film magnetic head described in Japanese Patent Application Laid-Open No. 2004-134039 in particular, the whole upper face of the lead constituting the thin-film coil on the upper side in the laminating direction is exposed, so that a part where the lead constituting the thin-film coil has a relatively small width as seen from the upper side in the laminating direction is also slightly milled, thus yielding a very large change in the cross-sectional area. This affects characteristics of the thin-film coil very much, which is problematic in that performances of thin-film magnetic heads fluctuate among products.

It is therefore an object of the present invention to provide a thin-film magnetic head which can keep performances from fluctuating, while restraining an organic insulating material from peeling off.

The present invention provides a thin-film magnetic head comprising a lower magnetic pole layer exposing an end part on a side of a medium-opposing surface opposing a recording medium, an upper magnetic pole layer opposing the end part of the lower magnetic pole layer such as to form a recording gap at one end part on the side of the medium-opposing surface and connecting with the lower magnetic pole layer at the other end part on a side remote from the medium-opposing surface, and a thin-film coil constituted by a lead wound about the other end part of the upper magnetic pole layer; the lower magnetic pole layer, the upper magnetic pole layer and the thin-film coil being laminated; wherein an organic insulating material made of an electrically insulating organic matter is interposed between turns adjacent to each other in the lead constituting the thin-film coil; wherein the lead constituting the thin-film coil has a minimum width part having the smallest width in the laminating direction and a maximum width part having the largest width in the laminating direction; wherein the minimum width part of the lead is arranged closer to the medium-opposing surface than is the other end part of the upper magnetic pole layer; wherein the maximum width part of the lead is arranged farther from the medium-opposing surface than is the other end part of the upper magnetic pole layer; wherein the upper face of the minimum width part of the lead in the laminating direction is totally covered with the organic insulating material; and wherein the upper face of the maximum width part of the lead in the laminating direction is formed with an uncoated area free of the organic insulating material.

In the thin-film magnetic head in accordance with the present invention, an uncoated area which is free of the organic insulating material but covered with an inorganic insulating material, for example, is formed on the upper face of the maximum width part of the lead in the laminating direction. Therefore, no organic insulating material peels off under a thermal load and the like at the part formed with the uncoated area, whereby the peeling of the organic insulating material is suppressed as compared with the case where the whole upper face in the laminating direction of the lead is covered with the organic insulating material. In the thin-film magnetic head in accordance with the present invention, the upper face of the minimum width part of the lead in the laminating direction is totally covered with the organic insulating material. Therefore, the minimum width part of the lead is kept from being slightly milled at the time of cleaning the wafer surface, whereby the influence on characteristics of the thin-film coil is very small. As a result, performances of the thin-film magnetic head can be kept from fluctuating, while restraining the inorganic insulating material from peeling off. The width of the lead constituting the thin-film coil as seen from the upper side in the laminating direction (as seen from the laminated layer surface of the lead constituting the thin-film coil) corresponds to the distance from one edge to the other edge in a direction perpendicular to a tangent of a virtual line passing the center of the lead.

Preferably, the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead in the laminating direction falls within the range of $$0 < t_C/t_R \leq 1.0.$$

When $t_C/t_R$ is greater than 1.0, the narrow gap between turns of the lead is filled with the inorganic insulating material, whereby cracks tend to occur in the vicinity of interfaces between the lead, the organic insulating material and the inorganic insulating material.

Preferably, the lead constituting the thin-film coil further has a variable width part where the width of the lead in the laminating direction becomes smaller toward the medium-opposing surface, the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead falls within the range of $$0.85 < t_C/t_R \leq 1.0,$$

and the uncoated area is formed on the upper face in the laminating direction of a part where the width W of the lead in the laminating direction satisfies $$X \leq (W - W_{min})/(W_{max} - W_{min}) \leq 1.0$$

(where $W_{min}$ is the width of the lead in the minimum width part in the laminating direction, $W_{max}$ is the width of the lead in the maximum width part in the laminating direction, and X is a value falling within the range of $0.4 \leq X \leq 0.7$)
(see, for example, Example 2 which will be explained later).

Preferably, the lead constituting the thin-film coil further has a variable width part where the width of the lead in the laminating direction becomes smaller toward the medium-opposing surface, the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead falls within the range of $$0.7 \leq t_C/t_R \leq 0.85,$$

and the uncoated area is formed on the upper face in the laminating direction of a part where the width W of the lead as seen from the upper part of the laminating direction satisfies $$X \leq (W - W_{min})/(W_{max} - W_{min}) \leq 1.0$$

(where $W_{min}$ is the width of the lead in the minimum width part in the laminating direction, $W_{max}$ is the width of the lead in the maximum width part in the laminating direction, and X is a value falling within the range of $0.4 \leq X \leq 0.6$)
(see, for example, Example 1 which will be explained later).

When X is below its lower limit, the uncoated area is also formed on the upper face of a part where the width of the lead as seen from the upper side in the laminating direction is relatively small, whereby the cleaning of the wafer surface tends to become more influential on characteristics of the thin-film coil. When X exceeds its upper limit, on the other hand, a large part of the upper face of the lead is covered with the organic insulating material (see, for example, FIG. 4), whereby the organic insulating material tends to be easier to peel off under a thermal load and the like. The value obtained by $(W - W_{min})/(W_{max} - W_{min})$ indicates the ratio of the lead width W when the difference between the lead widths $W_{max}$ and $W_{min}$ is assumed to be 1.

Preferably, the uncoated area is free of an edge part of the lead on the upper face side in the laminating direction, while the organic insulating material is formed so as to extend to the edge part. This can improve the coating ratio on the upper face of the lead in the laminating direction when forming the inorganic insulating material, and thus can reduce the occurrence of cracks in the vicinity of interfaces between the lead, the organic insulating material and the inorganic insulating material.

The present invention can provide a thin-film magnetic head which can keep performances from fluctuating, while restraining an organic insulating material from peeling off.

The present invention will be more fully understood from the detailed description given here in below and the accompanying drawings which are given by way of illustration only, and thus are not to be considered as limiting the present invention.

BRIEF DESCRIPTION OF THE DRAWINGS

FIG. 11 is a table showing embodied conditions and evaluation results of Examples 1-1 to 1-9 and Comparative Examples 1-1 and 1-2;

FIG. 12 is a table showing embodied conditions and evaluation results of Examples 2-1 to 2-9 and Comparative Examples 2-1 and 2-2;

FIG. 13 is a table showing embodied conditions and evaluation results of Examples 3-1 to 3-9 and Comparative Examples 3-1 and 3-2;

FIG. 14 is a table showing embodied conditions and evaluation results of Examples 4-1 to 4-9 and Comparative Examples 4-1 and 4-2;

FIG. 15 is a table showing embodied conditions and evaluation results of Examples 5-1 to 5-9 and Comparative Examples 5-1 and 5-2;

FIG. 16 is a table showing embodied conditions and evaluation results of Examples 6-1 to 6-9 and Comparative Examples 6-1 and 6-2;

FIGS. 17a and 17b are optical micrographs showing a thin-film magnetic head as seen in a track width direction perpendicular to the medium-opposing surface when the evaluation result is A as an example;

FIGS. 18a and 18b are optical micrographs showing how a resist film peels off in a thin-film magnetic head as seen in a track width direction perpendicular to the medium-opposing surface as an example;

DESCRIPTION OF THE PREFERRED EMBODIMENTS

Preferred embodiments of the present invention will now be explained with reference to the drawings. In the explanation, the same constituents or those having the same functions will be referred to with the same numerals while omitting their overlapping descriptions. The term "upper" used in the explanation corresponds to the upper side of FIGS. 1 to 6 and 8 (the upper side in the laminating direction).

(Structure of Thin-Film Magnetic Head)

Figure 1:
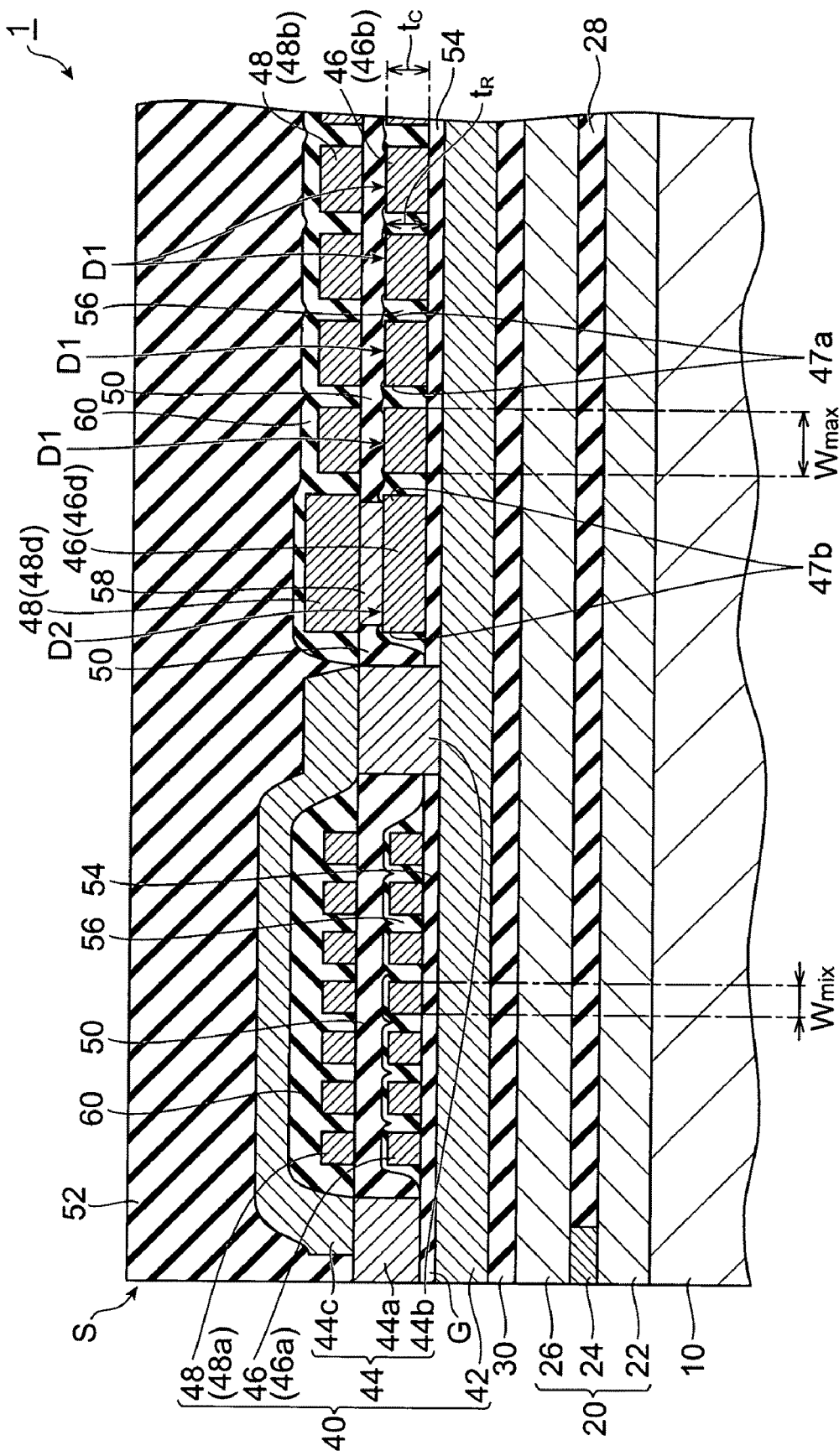
FIG. 1 is a schematic sectional view of a thin-film magnetic head in accordance with an embodiment as seen from a track width direction perpendicular to the medium-opposing surface.
Figure 2:
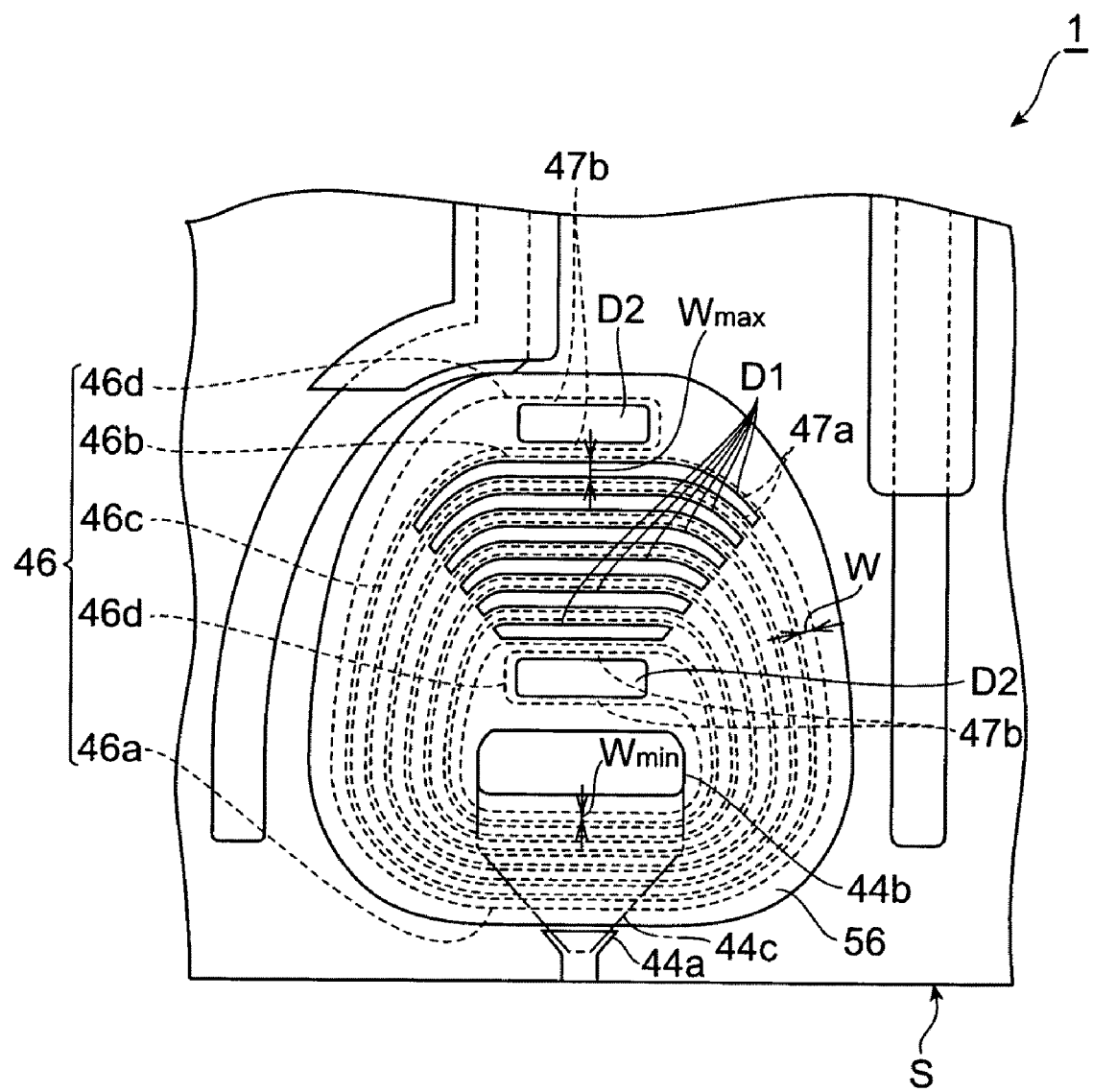
FIG. 2 is a top see-through view mainly showing the thin-film coil provided with the thin-film magnetic head in accordance with the embodiment.

With reference to FIGS. 1 and 2, the structure of the thin-film magnetic head 1 in accordance with an embodiment will be explained. FIG. 1 is a schematic sectional view of the thin-film magnetic head in accordance with the embodiment as seen in a track width direction perpendicular to the medium-opposing surface (also referred to as air bearing surface (ABS)). FIG. 2 is a top see-through view mainly showing the thin-film coil provided with the thin-film magnetic head in accordance with the embodiment.

The thin-film magnetic head 1 is provided on the upper side of a support 10, and constitutes a part of a magnetic head slider which is not depicted. The thin-film magnetic head 1 is a combined thin-film magnetic head in which a reading head part 20 having an MR (Magneto Resistive) device 24 which will be explained later, an insulating layer 30, and a recording head part 40 as an induction-type electromagnetic transducer are successively laminated on the support 10. In the thin-film magnetic head 1, the end face on the left side in FIG. 1 is the recording-medium-opposing surface (air bearing surface S) opposing a recording surface of a hard disk which is not depicted. The support 10 is constructed by forming an undercoat layer made of an electrically insulating nonmagnetic inorganic insulating material such as alumina ($Al_2O_3$) by a thickness on the order of 0.3 μm to 5.0 μm on a wafer made of AlTiC ($Al_2O_3$.TiC).

In the reading head part 20, a lower magnetic shield layer 22 which also acts as a lower electrode, the MR device 24, and an upper magnetic shield layer 26 which also acts as an upper electrode are successively laminated on the support 10. On both sides of the MR device 24 in the track width direction, a pair of bias supplying layers made of a hard magnetic material (not depicted) are formed while interposing an insulating layer 28.

The lower magnetic shield layer 22 and the upper magnetic shield layer 26 are made of a soft magnetic material such as NiFe (permalloy), and prevent the MR device 24 from sensing unnecessary external magnetic fields. The MR device 24 has a multilayer structure (not depicted) including a free layer, and is arranged on the air bearing surface S side so as to be exposed to the air bearing surface S.

By utilizing a magnetoresistance effect, the MR device 24 detects changes in a magnetic field inputted from the hard disk, thereby reading magnetic information recorded in the hard disk. GMR (Giant Magneto Resistive) devices utilizing giant magnetoresistance effects yielding a high magnetoresistance change ratio, AMR (Anisotropic Magneto Resistive) devices utilizing anisotropic magnetoresistance effects, TMR (Tunneling Magneto Resistive) devices utilizing magnetoresistance effects occurring at tunnel junctions, CPP (Current Perpendicular to Plane)-GMR devices, and the like may also be employed in place of the MR device 24.

The insulating layer 28 is made of a nonmagnetic inorganic insulating material such as $Al_2O_3$ or $SiO_2$, and prevents currents flowing through the free layer and the like included in the MR device 24 from leaking to the bias supplying layers.

The insulating layer 30 is made of a nonmagnetic inorganic insulating material such as $Al_2O_3$ or $SiO_2$, and is arranged, so as to be held between the reading head part 20 and the recording head part 40. The thickness of the insulating layer 30 may be on the order of 0.1 μm to 2.0 μm, for example.

The recording head part 40 has a lower magnetic pole layer 42 and an upper magnetic pole layer 44 successively from the side closer to the support 10, and further includes first and second thin-film coils 46, 48. Insulating layers 50, 52 each made of a nonmagnetic inorganic insulating material such as $Al_2O_3$ or $SiO_2$ are formed between the first and second thin-film coils 46, 48 and on the upper side of the upper magnetic pole layer 44 above the second thin-film coil 48, respectively.

The lower magnetic pole layer 42 is formed on the upper face of the insulating layer 30. The lower magnetic pole layer 42 is made of a material having a highly saturated magnetic flux density such as FeAlN, FeN, FeCo, CoFeN, or FeZrN.

As with the lower magnetic pole layer 42, the upper magnetic pole layer 44 is made of a material having a highly saturated magnetic flux density such as FeAlN, FeN, FeCo, CoFeN, or FeZrN, and has a first upper magnetic pole part 44a, a second upper magnetic pole part 44b, and a third upper magnetic pole part 44c. The first upper magnetic pole part 44a is formed at a position opposing the lower magnetic pole layer 42 while interposing a recording gap layer 54 therebetween on the air bearing surface S side. The end parts of the first upper magnetic pole part 44a and the lower magnetic pole layer 42 on the air bearing surface S side are exposed to the air bearing surface S, while the recording gap layer 54 forms a recording gap G. The second upper magnetic pole part 44b is formed so as to be positioned on the side remote from the air bearing surface S, and is connected to the lower magnetic pole layer 42. Therefore, the second upper magnetic pole part 44b and the lower magnetic pole layer 42 are magnetically coupled to each other. The third upper magnetic pole part 44c is formed on the upper side of the first upper magnetic pole part 44a and the second upper magnetic pole part 44b and is connected to the first upper magnetic pole part 44a and the second upper magnetic pole part 44b. Therefore, the third upper magnetic pole part 44c is magnetically coupled to the first upper magnetic pole part 44a and the second upper magnetic pole part 44b. Consequently, the upper magnetic pole layer 44 and the lower magnetic pole layer 42 form a magnetic circuit holding the recording gap G therebetween.

As shown in FIGS. 1 and 2, the first and second thin-film coils 46, 48 are spirally constructed such that respective leads are wound about the end part of the upper magnetic pole layer 44 on the side remote from the air bearing surface S, i.e., the end parts of the second upper magnetic pole part 44b and the third upper magnetic pole part 44c on the side remote from the air bearing surface S. The first and second thin-film coils 46, 48 are those generating magnetic fields near the recording gap G by electromagnetic induction, thereby storing magnetic information onto the recording surface of the hard disk.

As shown in FIG. 2, the first thin-film coil 46 is formed on the recording gap layer 54. The first thin-film coil 46 comprises a lead constituted by a minimum width part 46a where the lead width is the smallest as seen from the upper side in the laminating direction, a maximum width part 46b where the lead width is the largest as seen from the upper side in the laminating direction, and a variable width part 46c other than these parts; and a pair of lead conductors 46d for electrically connecting the first thin-film coil 46 to other members.

In the lead constituting the first thin-film coil 46, the minimum width part 46a is a part positioned closer to the air bearing surface S than is the end part (second upper magnetic pole part 44b) of the upper magnetic pole layer 44 on the side remote from the air bearing surface S, and includes a plurality of turns (by the number of turns of the first thin-film coil 46) so as to extend along the air bearing surface S (track width direction). A portion of the minimum width part 46a is arranged between the lower magnetic pole layer 42 and the upper magnetic pole layer 44. The lead width $W_{min}$ of the minimum width part 46a as seen from the upper side in the laminating direction (see FIGS. 1 and 2) is set shorter than that of the maximum width part 46 in order to shorten the magnetic path length formed by connecting the lower magnetic pole layer 42 and the upper magnetic pole layer 46 to each other, thereby improving the recording characteristic in a high-frequency band, and may be on the order of 0.6 μm to 2.0 μm, for example.

In the lead constituting the first thin-film coil 46, the maximum width part 46b is a part formed on the side farther from the air bearing surface S than is the end part (second upper magnetic pole part 44b) of the upper magnetic pole layer 44 on the side remote from the air bearing surface S, and includes a plurality of turns (by the number of turns of the first thin-film coil 46) so as to extend along the air bearing surface S (track width direction). The lead width $W_{max}$ of the maximum width part 46b as seen from the upper side in the laminating direction (see FIGS. 1 and 2) may be on the order of 2.0 μm to 10.0 μm, for example, while the thickness $t_C$ of the maximum width part 46b in the laminating direction (see FIG. 1) may be on the order of 1.0 μm to 4.0 μm, for example. Here, the first thin-film coil 46 includes not only the minimum width part 46a but also the maximum width part 46b in order to reduce the resistance value of the first thin-film coil 46, which changes in reverse proportion to the cross-sectional area of the lead constituting the first thin-film coil 46, thereby suppressing heat generation and restraining the first thin-film coil 46 from expanding itself.

As shown in FIG. 2, when seen from the upper side in the laminating direction, the variable width part 46c decreases the lead width as it approaches the air bearing surface S and increases the lead width as it is distanced farther from the air bearing surface S. The lead conductors 46d are integrally formed with the respective end parts of the lead constituting the first thin-film coil 46.

As shown in FIGS. 1 and 2, a resist film 56 made of an organic insulating material is interposed between turns adjacent to each other in the lead constituting the first thin-film coil 46. The thickness $t_R$ of the resist film 56 in the laminating direction may be on the order of 0.8 μm to 4.3 μm, for example. Preferably, the maximum width part 46b and the resist film 56 are constructed such that the ratio $t_C/t_R$ of the thickness $t_C$ of the maximum width part 46b in the first thin-film coil 46 in the laminating direction to the thickness $t_R$ of the resistance film 56 in the laminating direction falls within the range of $$0 < t_C/t_R \leq 1.0.$$

When $t_C/t_R$ is greater than 1.0, the narrow gap between turns of the lead in the first thin-film coil 46 is filled with an inorganic insulating material such as $Al_2O_3$, whereby cracks tend to occur in the vicinity of interfaces between the thin-film coil 46, the insulating layer 50, and the resist film 56.

Resist-uncoated areas D1 which are coated with the insulating layer 50 constituted by the nonmagnetic inorganic insulating material such as $Al_2O_3$ or $SiO_2$ but not with the resist film 56 are set in a part of the upper face of the lead constituting the first thin-film coil 46. Resist-uncoated areas D2 provided with a connecting layer 58 which will be explained later and not covered with the resist film 56 are set in respective portions of the upper face in both end parts of the lead conductors 46d. In this embodiment, as shown in FIGS. 1 and 2, no resist-uncoated area D1 is set on the upper face in edge parts 47a of the lead constituting the first thin-film coil 46, whereas no resist-uncoated area D2 is set on edge parts 47b of the lead conductors 46d. Namely, at these edge parts 47a, 47b, the resist film 56 is formed such as to cover about 2.0% to 30% of the lead width W of the lead constituting the first thin-film coil 46, for example, as seen from the upper side in the laminating direction.

In this embodiment, as shown in FIG. 2, the resist-uncoated areas D1 are set in a portion extending from the maximum width part 46b to a part of the variable width part 46c on the maximum width part 46b side in the lead constituting the first thin-film coil 46. When the maximum width part 46b and the resist film 56 are constructed such that the ratio $t_C/t_R$ of the thickness $t_C$ of the maximum width part 46b in the laminating direction to the thickness $t_R$ of the resistance film 56 in the laminating direction falls within the range of $$0.85 < t_C/t_R \leq 1.0,$$

it will be preferred if the resist-uncoated areas D1 are set in a part where the lead width W of the lead constituting the first thin-film coil 46 as seen from the upper part in the laminating direction satisfies $$X \leq (W - W_{min})/(W_{max} - W_{min}) \leq 1.0$$

(where X is a value falling within the range of $0.4 \leq X \leq 0.7$) (see, for example, Example 2 which will be explained later). When the maximum width part 46b and the resist film 56 are constructed such that the ratio $t_C/t_R$ of the thickness $t_C$ of the maximum width part 46b in the laminating direction to the thickness $t_R$ of the resistance film 56 in the laminating direction falls within the range of $$0.7 \leq t_C/t_R \leq 0.85,$$

it will be preferred if the resist-uncoated areas D1 are set in a part where the lead width W of the lead constituting the first thin-film coil 46 as seen from the upper part in the laminating direction satisfies $$X \leq (W - W_{min})/(W_{max} - W_{min}) \leq 1.0$$

where X is a value falling within the range of $0.4 \leq X \leq 0.6$ (see, for example, Example 1 which will be explained later).

Figure 7:
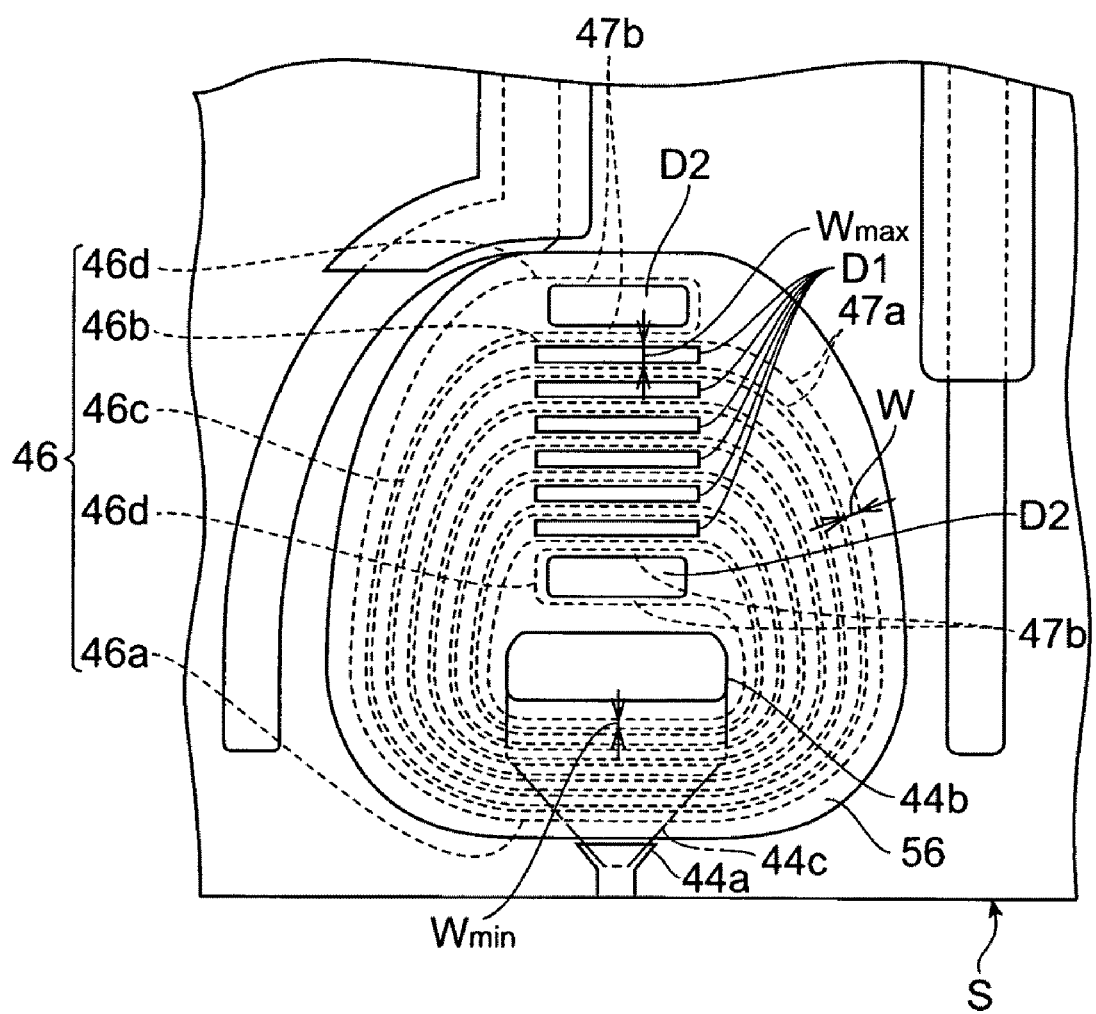
FIG. 7 is a top see-through view showing an example of setting of a resist-uncoated area.
Figure 8:
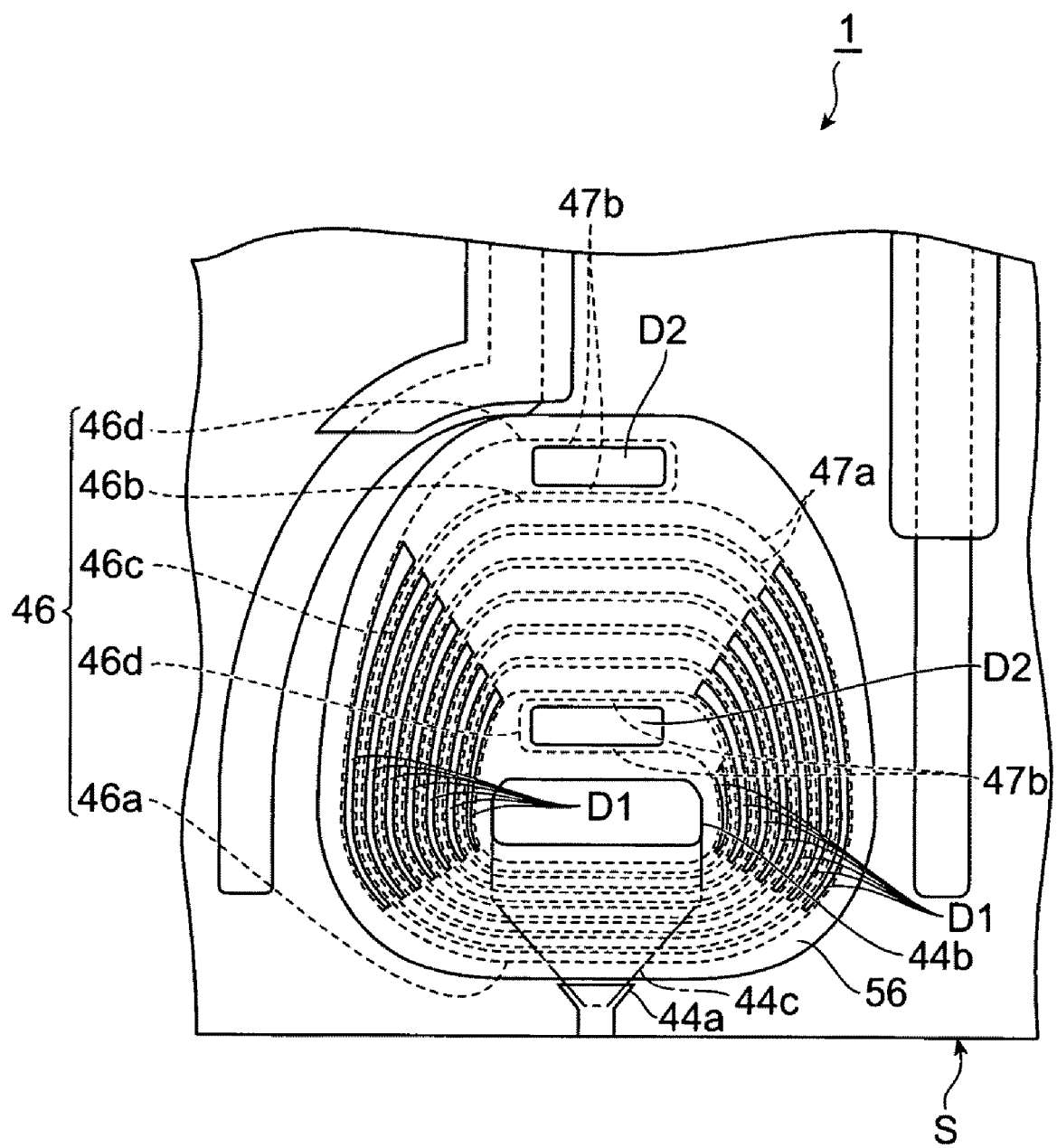
FIG. 8 is a top see-through view showing another example of setting of a resist-uncoated area.

Here, the value obtained by $(W - W_{min})/(W_{max} - W_{min})$ indicates the ratio of the line width W when the difference between the lead widths $W_{max}$ and $W_{min}$ is assumed to be 1. For example, "the part where the lead width W satisfies $(W - W_{min})/(W_{max} - W_{min}) = 1$ as the part where the resist-uncoated areas D1 are set" means that the resist-uncoated areas D1 are set on the upper face in a part where the lead width W equals $W_{max}$ in the lead constituting the first thin-film coil 46, i.e., on the upper face of the maximum width part 46b (see, for example, FIG. 7). For example, "the part where the lead width W satisfies $A \leq (W - W_{min})/(W_{max} - W_{min}) \leq B$ (where $0 \leq A \leq 1$, $0 \leq B \leq 1$, and $A \leq B$) as the part where the resist-uncoated areas D1 are set" means that the resist-uncoated areas D1 are set on the upper face of the lead constituting the first thin-film coil 46 ranging from a part where the lead width W equals $(W_{max} - W_{min})A + W_{min}$ to a part where the lead width W equals $(W_{max} - W_{min})B + W_{min}$ (see, for example, FIG. 8). Namely, A defines the lower limit of the lead width W at which the uncoated areas D1 are set, while B defines the upper limit of the lead width W at which the uncoated areas D1 are set. Therefore, "the part where the lead width W satisfies $X \leq (W-W_{min})/(W_{max}-W_{min}) \leq 1.0$ as the part where the resist-uncoated areas D1 are set" defined in this embodiment means that the resist-uncoated areas D1 are set on the upper face of the lead constituting the first thin-film coil 46 ranging from a part where the lead width W equals $(W_{max}-W_{min})X+W_{min}$ to a part where the lead width W equals $W_{max}$ (maximum width part 46). Hence, X defines the lower limit of the lead width W, thereby determining a range in which the resist-uncoated areas D1 are set. When X is below its lower limit, the upper face of the lead constituting the first thin-film coil 46 in a part where the lead width W is relatively small is substantially free of the resist film 56, whereby cleaning of the wafer surface (which will later be explained in detail) tends to become more influential on characteristics of the first thin-film coil 46. When X exceeds its upper limit, on the other hand, a large part of the upper face of the lead constituting the first thin-film coil 46 is covered with the resist film 56 (see, for example, FIG. 4), whereby the resist film 56 tends to be easier to peel off under a thermal load and the like.

The upper face of the lead constituting the first thin-film coil 46 in the part free of the resist-uncoated areas D1, D2 is totally covered with the resist film 56. The resist film 56 is just required to cover the whole upper face of at least the minimum width part 46a, and preferably covers the whole upper face of the part closer to the air bearing surface S than is the end part (second upper magnetic pole part 44b) on the side remote from the air bearing surface S in the upper magnetic pole layer 44 in the lead constituting the first thin-film coil 46.

The second thin-film coil 48 is formed on the insulating layer 50. As in the first thin-film coil 46, the lead constituting the second thin-film coil 48 comprises a lead constituted by a minimum width part 48a where the lead width is the smallest as seen from the upper side in the laminating direction, a maximum width part 48b where the lead width is the largest as seen from the upper side in the laminating direction, and a variable width part (not depicted) other than these parts; and a pair of lead conductors 48d for electrically connecting the second thin-film coil 48 to other members. The lead conductor 48d of the second thin-film coil 48 are connected to the lead conductor 46d of the first thin-film coil 46 through the connecting layer 58. The connecting layer 58 is made of a material similar to that of the lower magnetic pole layer 42 and the upper magnetic pole layer 44. A resist film 60 which is an organic insulating material is interposed between turns adjacent to each other in the lead constituting the second thin-film coil 48. The upper face of the lead constituting the second thin-film coil 48 in the laminating direction is totally covered with the resist film 60.

(Method of Manufacturing Recording Head Part)

Figure 3:
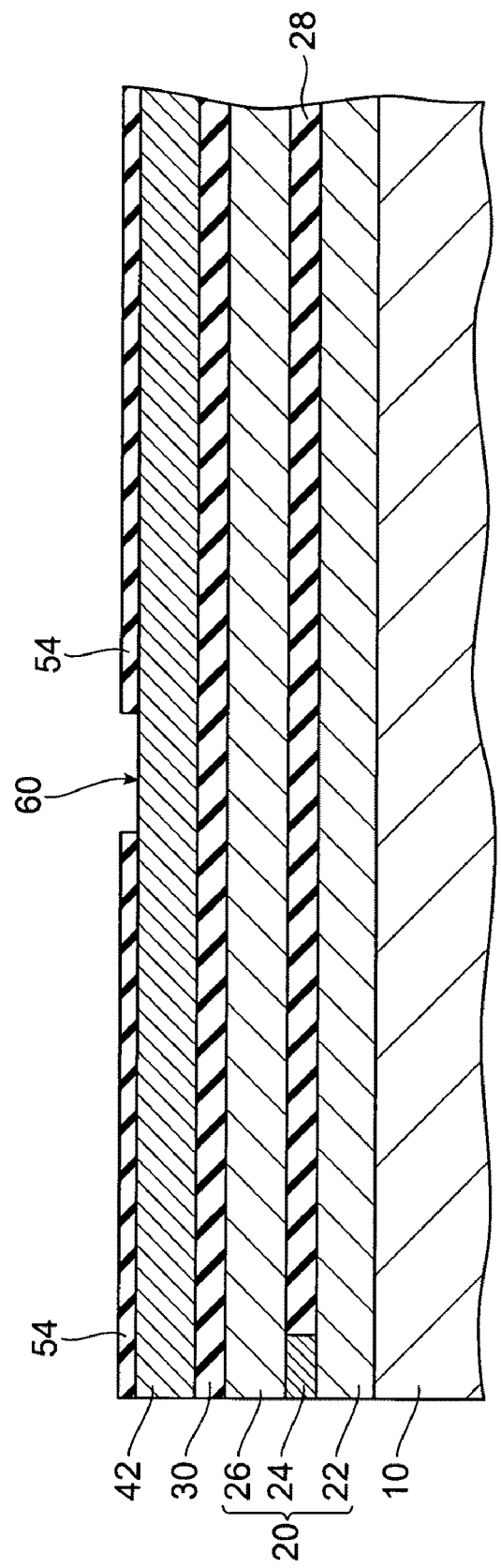
FIG. 3 is a view showing a step of manufacturing a recording head part constituting the thin-film magnetic head in accordance with the embodiment.
Figure 4:
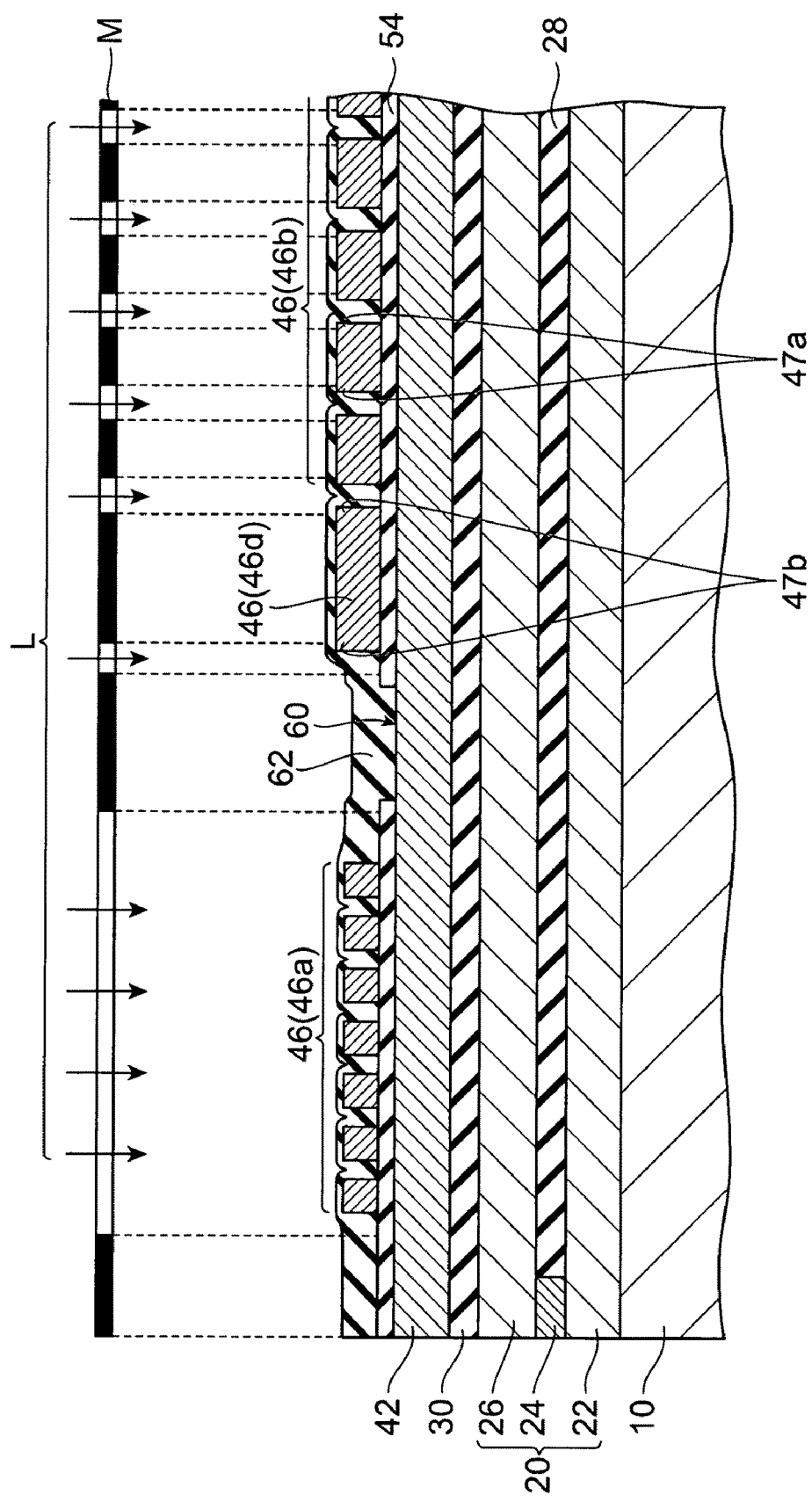
FIG. 4 is a view showing a step subsequent to that of FIG. 3.
Figure 5:
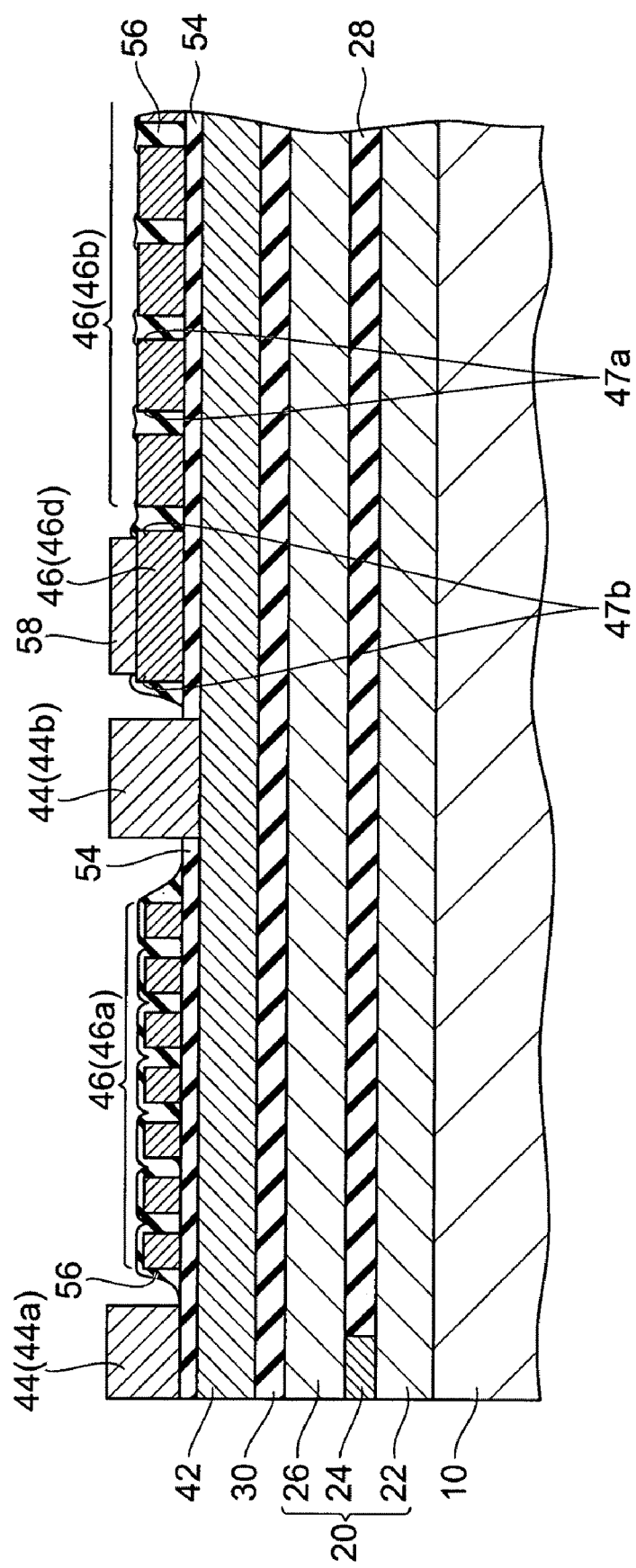
FIG. 5 is a view showing a step subsequent to that of FIG. 4.
Figure 6:
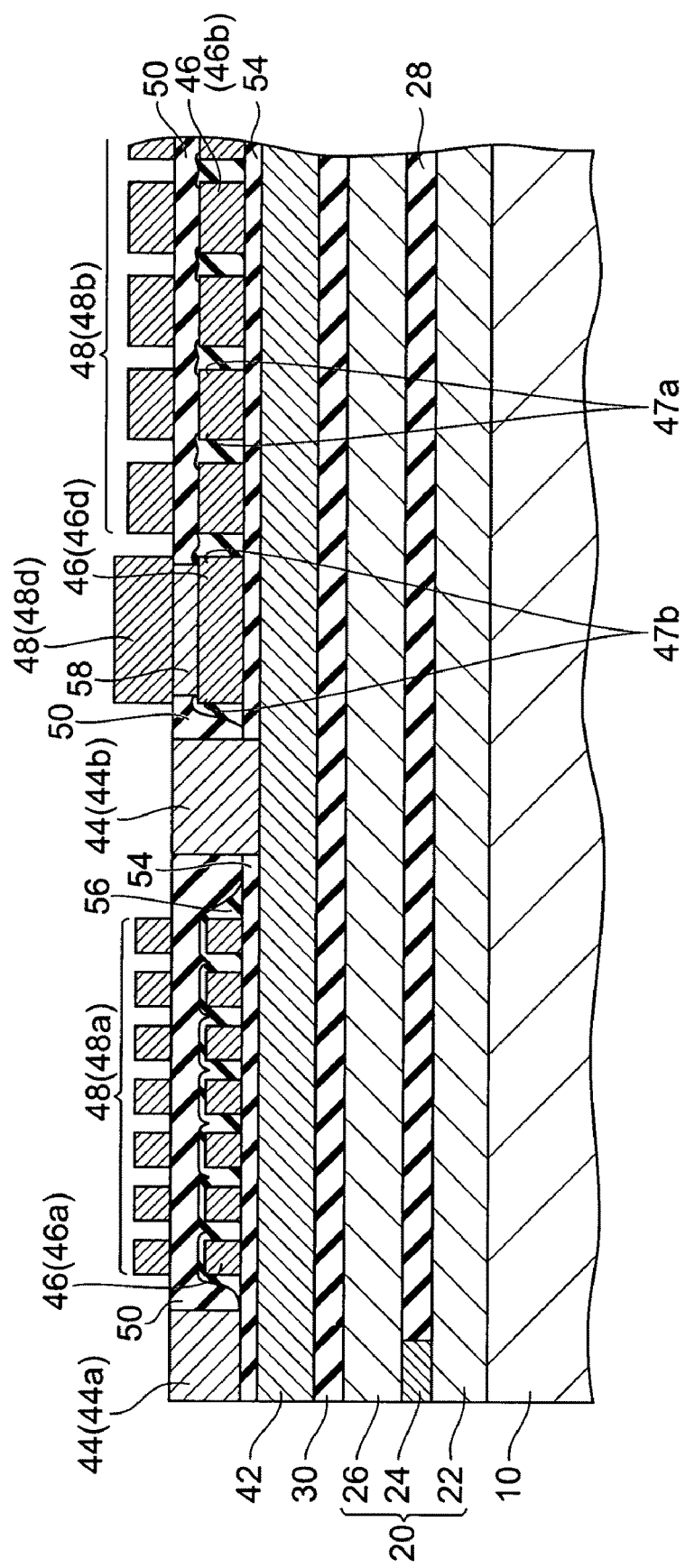
FIG. 6 is a view showing a step subsequent to that of FIG. 5.

With reference to FIGS. 1 to 6, a method of manufacturing the recording head part 40 constituting the thin-film magnetic head 1 will now be explained. FIG. 3 is a view showing a step of manufacturing the recording head part constituting the thin-film magnetic head in accordance with the embodiment. FIG. 4 is a view showing a step subsequent to that of FIG. 3. FIG. 5 is a view showing a step subsequent to that of FIG. 4. FIG. 6 is a view showing a step subsequent to that of FIG. 5. Though each drawing shows only one device, a plurality of thin-film magnetic heads 1 are manufactured from one wafer in practice.

First, as shown in FIG. 3, an undercoat layer made of an insulating material is formed on a wafer made of AlTiC, so as to construct the support 10. Subsequently, the reading head part 20, insulating layer 30, and lower magnetic pole layer 42 are successively laminated on the support 10. The insulating layer 30 can be formed by sputtering, for example, while the lower magnetic pole layer 42 can be formed by sputtering or plating, for example. Subsequently, the recording gap layer 54 is laminated on the lower magnetic pole layer 42. The recording gap layer 54 can be formed by sputtering, for example, with a nonmagnetic inorganic insulating material such as $Al_2O_3$. Then, a part to be formed with the second upper magnetic pole part 44b in a later step is partly etched, so as to form an opening 60.

The next step will now be explained with reference to FIG. 4. To begin with, the first thin-film coil 46 having a spiral form wound about the opening 60 is formed on the recording gap layer 54. The first thin-film coil 46 can be formed by frame plating, for example, with a conductor such as Cu. Subsequently, the whole wafer surface is uniformly coated with a resin such as photoresist, so as to form a resin film 62. Then, a part to be left as the resist film 56 in the resin film 62 is irradiated with light L through a photomask M.

The next step will now be explained with reference to FIG. 5. First, the resin film 62 is developed, and the part not exposed to light in the resin film 62 is removed. Then, the remaining part in the resin film 62 is hardened by heating (curing), so as to form the resist film 56. Subsequently, the first upper magnetic pole part 44a and the second upper magnetic pole part 44b in the upper magnetic pole layer 44 and the connecting layer 58 are formed by frame plating, for example. Here, the first upper magnetic pole part 44a is formed on the air bearing surface S side, the second upper magnetic pole part 44b is formed on the upper side of the opening 60, and the connecting layer 58 is formed on the upper side of the lead conductor 46d of the first thin-film coil 46. Subsequently, using an etching mask which is not depicted, ion beam etching or reactive ion etching (RIE) is performed, so as to yield a trimmed structure (see FIG. 2) in which the width of the first upper magnetic pole part 44a becomes narrower toward the air bearing surface S.

The next step will now be explained with reference to FIG. 6. First, for improving the adhesion between an insulating film which will be formed in a step immediately thereafter and the wafer, the whole surface of the wafer is slightly milled, so as to clean the whole wafer surface. Subsequently, an insulating film (not depicted) made of a nonmagnetic insulating material such as $Al_2O_3$ is formed on the whole wafer surface by sputtering, for example. Then, the insulating film is polished by chemical mechanical polishing (CMP), for example, until the surfaces of the first upper magnetic pole part 44a, the second upper magnetic pole part 44b, and the connecting layer 58 are exposed, so as to be flattened, whereby the insulating layer 50 is formed. Thereafter, as with the first thin-film coil 46, the second thin-film coil 48 is formed on the insulating layer 50.

Next, a resin such as photoresist is uniformly applied to the whole wafer surface, so as to form a resin film which is not depicted, and the part covering the second thin-film coil 48 in the resin film is exposed to light. Then, the resin film is developed and heated (cured), so as to form the resist film 60. Subsequently, the third upper magnetic pole part 44c in the upper magnetic pole layer 44 is formed by frame plating, for example. Here, the third upper magnetic pole part 44c is formed such as to connect the first upper magnetic pole part 44a and the second upper magnetic pole part 44b to each other. Then, the insulating film 52 is laminated so as to cover the whole wafer surface. The insulating film 52 can be formed by sputtering, for example, with a nonmagnetic inorganic insulating material such as $Al_2O_3$. Thereafter, the surface of the insulating film 52 is flattened by CMP. Thus, the thin-film magnetic head 1 shown in FIG. 1 together with the recording head part 40 is obtained.

Figure 9:
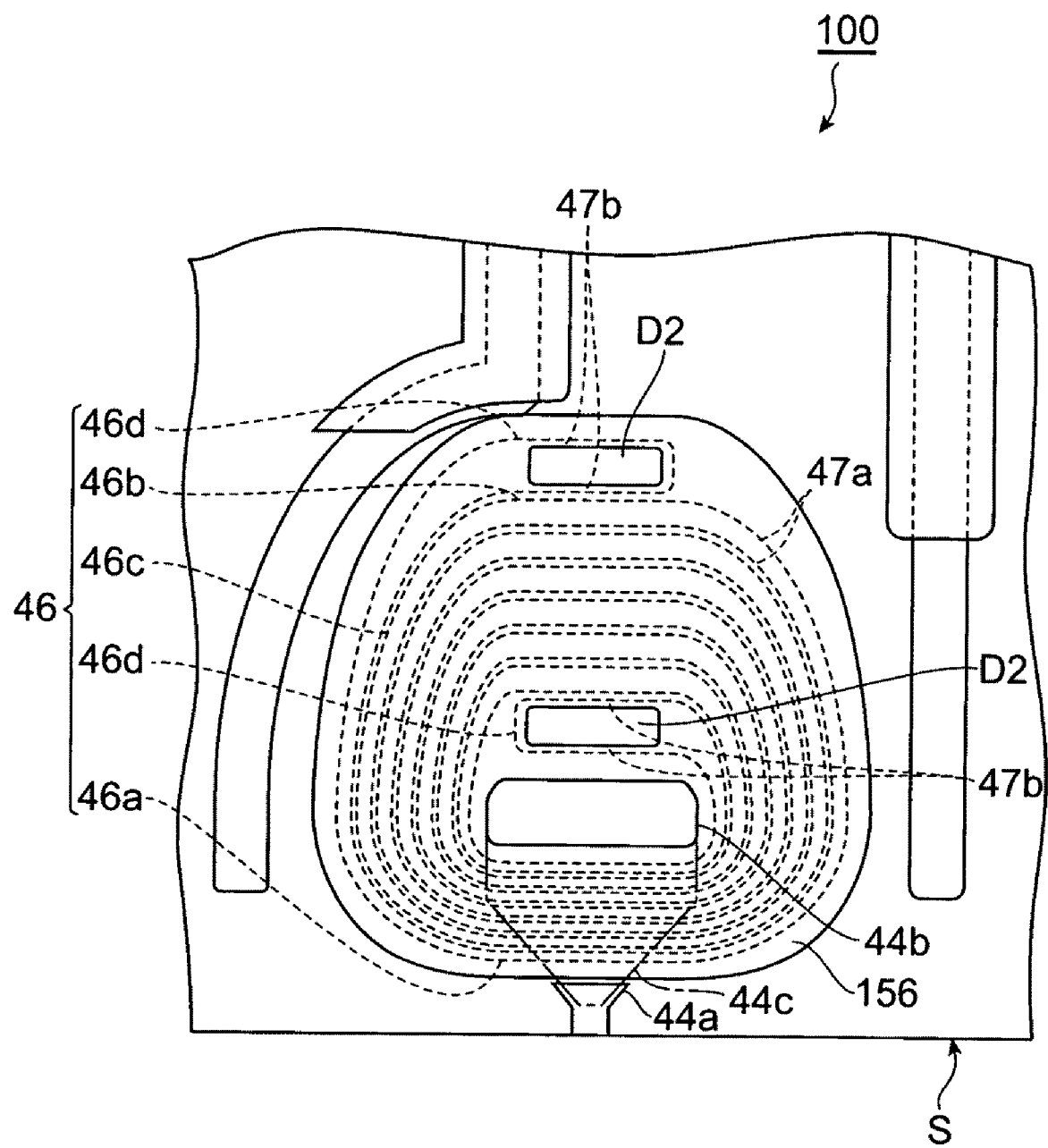
FIG. 9 is a top see-through view mainly showing a thin-film coil provided with a conventional thin-film magnetic head.
Figure 10:
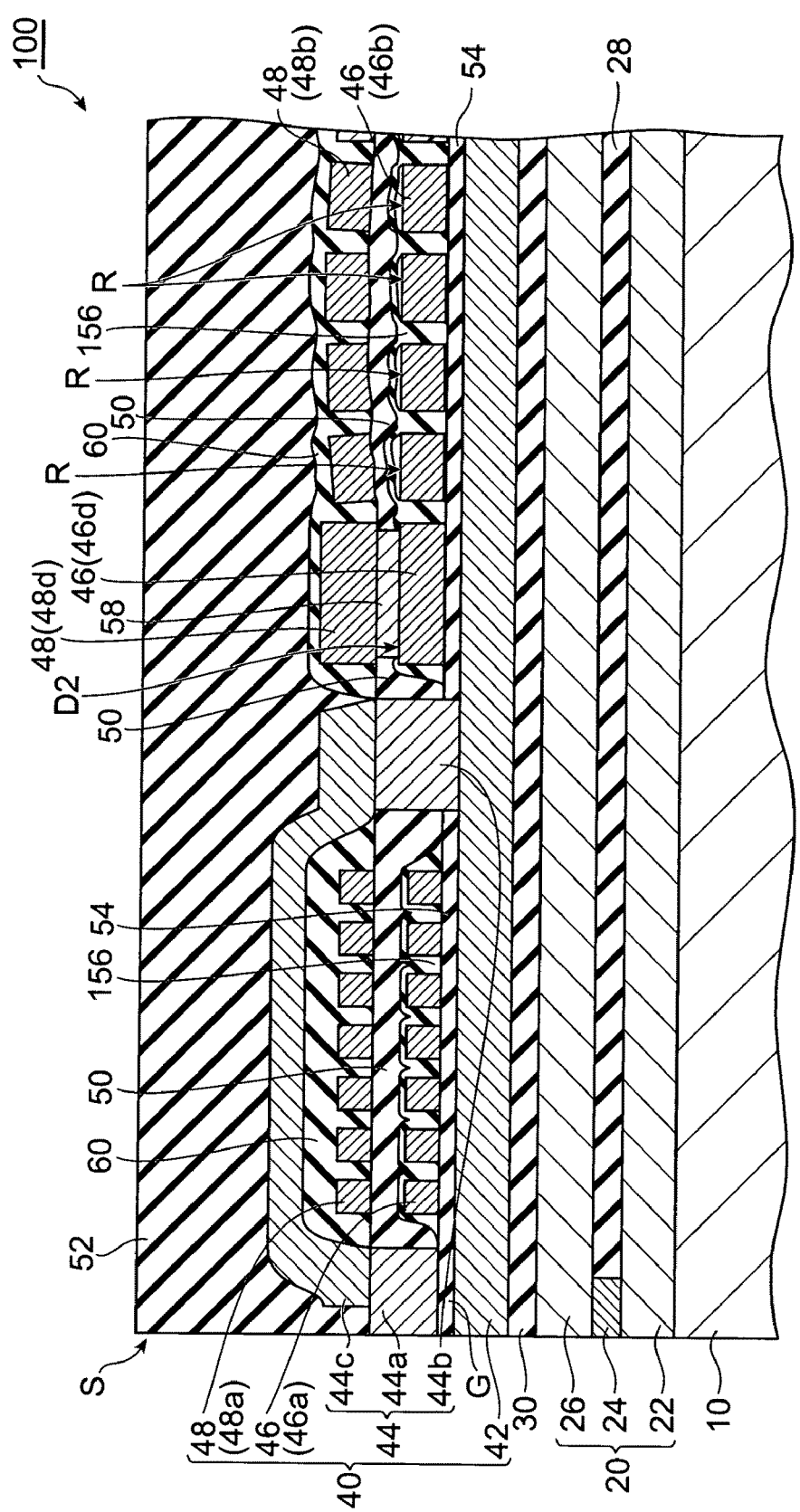
FIG. 10 is a schematic sectional view of the conventional thin-film magnetic head as seen from the track width direction perpendicular to the medium-opposing surface.

In a conventional thin-film magnetic head 100, as shown in FIGS. 9 and 10, only resist-uncoated areas D2 having the connecting layer 58 arranged on the upper side thereof and being free of a resist film 156 are formed on the upper face of the lead constituting the first thin-film coil 46, whereas resist-uncoated areas D1 covered with the insulating layer 50 made of a nonmagnetic inorganic insulating material such as $Al_2O_3$ or $SiO_2$ mentioned above but not with the resist film 156 are not formed. Namely, in the conventional thin-film magnetic head 100, the upper face of the lead constituting the first thin-film coil 46 except for the resist-uncoated areas D2 is totally covered with the resist film 156. The thermal load at the time of heating (curing) the resist film 60 covering the second thin-film coil 48 after forming the resist film 156 generates a stress in the resist film 156, whereas the magnitude of the stress is in proportion to the volume of the resist film 156. Therefore, as shown in FIG. 10, peeled parts R where the resist film 156 is peeled off are generated in particular on the upper face of a part of the first thin-film coil 46 where the lead width is relatively large as seen from the upper side in the laminating direction in the conventional thin-film magnetic head 100.

Hence, a thin-film magnetic head in which a resist film exists only between turns adjacent to each other in the lead constituting the first thin-film coil while the upper face of the lead constituting the first thin-film coil is free of the resist film has been known. Such a thin-film magnetic head keeps the resist film from peeling off from the upper face of the lead constituting the first thin-film coil. In such a thin-film magnetic head, however, the whole upper face of the lead constituting the thin-film coil in the laminating direction is exposed, so that a part where the lead constituting the thin-film coil has a relatively small width when seen from the upper side in the laminating direction is also slightly milled by cleaning, thus yielding a very large change in the cross-sectional area of the thin-film coil. This affects characteristics of the thin-film coil very much, which is problematic in that performances of thin-film magnetic heads fluctuate among products.

In this embodiment, by contrast, the resist-uncoated areas D1 free of the resist film 56 are formed on the upper face of the lead constituting the first thin-film coil 46. Therefore, the resist film 56 does not peel off under a thermal load and the like at the part formed with the resist-uncoated areas D1 in the upper face of the lead constituting the first thin-film coil 46, whereby the peeling of the resist film 56 is suppressed as compared with the case where no resist-uncoated areas D1 are formed on the upper face of the lead constituting the first thin-film coil 46. In this embodiment, the upper face of at least the minimum width part 46a is totally covered with the resist film 56. Therefore, the upper face of the minimum width part 46a is kept from being slightly milled at the time of cleaning the wafer surface, whereby the influence on characteristics of the thin-film coil 46 is very small. As a result, performances of the thin-film magnetic head 1 can be kept from fluctuating, while restraining the resist film 56 from peeling off.

In this embodiment, the maximum width part 46b and the resist film 56 are constructed such that the ratio $t_C/t_R$ of the thickness $t_C$ of the maximum width part 46b in the laminating direction to the thickness $t_R$ of the resist film 56 in the laminating direction falls within the range of $$0 < t_C/t_R \leq 1.0.$$

Therefore, the thickness $t_R$ of the resist film 56 in the laminating direction becomes greater than the thickness $t_C$ of the maximum width part 46b in the first thin-film coil 46 in the laminating direction, whereby cracks, which have been likely to occur in the vicinity of interfaces between the first thin-film coil 46, the resist film 56, and the insulating layer 50 when narrow gaps between turns of the first thin-film coil 46 are filled with the insulating layer 50 and the like made of the nonmagnetic inorganic insulating material such as $Al_2O_3$ or $SiO_2$, are very hard to occur.

In this embodiment, the resist-uncoated areas D1, D2 do not include edge parts of the lead constituting the first thin-film coil 46, while the resist film 56 is formed so as to extend to the edge parts of the portions formed with the resist-uncoated areas D1, D2 in the lead constituting the first thin-film coil 46. This can improve the coating ratio on the upper face of the lead constituting the first thin-film coil 46 when forming the insulating layer 50, and thus can reduce the occurrence of cracks in the vicinity of interfaces between the first thin-film coil 46, the insulating layer 50, and the resist film 56.

Though a preferred embodiment of the present invention is explained in detail in the foregoing, the present invention is not limited to the embodiment mentioned above. For example, though two layers of thin-film coils are laminated in this embodiment, only one layer or three or more layers of thin-film coils may be laminated. When two or more layers of thin-film coils are laminated, the present invention is applicable to any of the thin-film coils where the resist film may peel off.

Though the resist-uncoated areas D1, D2 are free of the resist film 56 in this embodiment, at least the minimum width part 46a in the lead constituting the first thin-film coil 46 may be covered with the resist film 56, while forming a resist-uncoated area in at least a portion of the other part.

Example 1

The present invention will now be explained more specifically with reference to Examples 1-1 to 1-9 and Comparative Examples 1-1 and 1-2 and FIG. 11, but is not restricted to the following examples. FIG. 11 is a table showing embodied conditions and evaluation results of Examples 1-1 to 1-9 and Comparative Examples 1-1 and 1-2.

Example 1-1

On a substrate made of $Al_2O_3$.TiC, $Al_2O_3$ was laminated as an undercoat layer, so as to form the support 10. Then, according to the above-mentioned method of manufacturing the thin-film magnetic head 1, the reading head part 20, the insulating layer 30, the recording head part 40, the resist films 56, 60, and the insulating layers 50, 52 were formed, so as to yield the thin-film magnetic head 1. In the thin-film magnetic head 1 of Example 1-1, the lead width $W_{min}$ of the minimum width part 46a as seen from the upper part in the laminating direction was set to 1.9 μm, while the lead width $W_{max}$ of the maximum width part 46b as seen from the upper part in the laminating direction was set to 5.0 μm. Also, in the thin-film magnetic head 1 of Example 1-1, the thickness $t_C$ of the maximum width part 46b in the laminating direction was set to 2.0 μm, while the thickness $t_R$ of the resist film 56 in the laminating direction was set to 2.5 μm, so that the ratio $t_C/t_R$ of the thickness $t_C$ of the maximum width part 46b in the first thin-film coil 46 in the laminating direction to the thickness $t_R$ of the resist film 56 in the laminating direction became 0.8. Further, in the thin-film magnetic head 1 of Example 1-1, resist-uncoated areas D1 were formed on the upper face in the laminating direction of the part where the lead width W of the lead constituting the first thin-film coil 46 as seen from the upper side in the laminating direction satisfied $$X \leq (W - W_{min})/(W_{max} - W_{min}) \leq 1.0$$

(where X=0.1).

Here, the resist film 56 was formed such as to extend by about 0.5 μm (by about 10% to 22.6% of the lead width W of the lead constituting the first thin-film coil 46 as seen from the upper side in the laminating direction) to the edge parts of the lead constituting the first thin-film coil 46 in the resist-uncoated areas D1.

Examples 1-2 to 1-9

The thin-film magnetic heads 1 of Examples 1-2 to 1-9 were obtained as in Example 1-1 except that X was set to 0.2, 0.3, 0.4, 0.5, 0.6, 0.7, 0.8, and 0.9, respectively.

Comparative Example 1-1

The thin-film magnetic head of Comparative Example 1-1 was obtained as in Example 1-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 1-2

The thin-film magnetic head of Comparative Example 1-2 was obtained as in Example 1-1 except that the whole upper face of the lead constituting the first thin-film coil was covered with the resist film (the whole upper face of the lead constituting the first thin-film coil was coated).

(Evaluation Results)

When the thin-film magnetic heads 1 of Examples 1-1 to 1-9 were cut at a predetermined plane and observed, the peeling of the resist film 56 was "no" or "nearly no". The resistance value rising rates in the thin-film coils in the thin-film magnetic heads 1 of Examples 1-1 to 1-9 (values determined as $(R_1-R_2)/R_1$, where $R_1$ was the resistance value of the thin-film coil in the thin-film magnetic head in which the whole upper face of the lead constituting the first thin-film coil was coated, and $R_2$ was the resistance value of the thin-film coil in the thin-film magnetic head to be measured) were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 1-1 to 1-3, and "low" in the thin-film magnetic heads 1 of Examples 1-4 to 1-9. Further, when the thin-film magnetic heads 1 of Examples 1-1 to 1-9 were cut at a predetermined plane and observed, the occurrence of cracks was "no" in the vicinity of interfaces between the first thin-film coil 46, the insulating layer 50, and the resist film 56. In view of the foregoing, the evaluation result of the quality of the thin-film magnetic heads 1 in Examples 1-1 to 1-9 was either "A: excellent" or "B: good". FIG. 17 shows an optical micrograph of a thin-film magnetic head as seen in a track width direction perpendicular to the medium-opposing surface when the evaluation result is A as an example.

When the thin-film magnetic heads of Comparative Examples 1-1 and 1-2 were cut at a predetermined plane and observed, on the other hand, the peeling of the resist film was "no" in Comparative Example 1-1, and "yes" in Comparative Example 1-2. FIG. 18 shows an optical micrograph of how a resist film peels off in a thin-film magnetic head as seen in a track width direction perpendicular to the medium-opposing surface as an example. The resistance value rising rates of the thin-film coils in the thin-film magnetic heads of Comparative Examples 1-1 and 1-2 were measured and found to be 9.5 and 0.0, respectively. Namely, the resistance value rising rate of the thin-film coil was "high" in the thin-film magnetic head of Comparative Example 1-1, and "no" in the thin-film magnetic head of Comparative Example 1-2. Further, when the thin-film magnetic heads of Comparative Examples 1-1 and 1-2 were cut at a predetermined plane and observed, the occurrence of cracks was "no" in the vicinity of interfaces between the first thin-film coil, the insulating layer, and the resist film. In view of the foregoing, the evaluation result of the quality of the thin-film magnetic heads in Comparative Examples 1-1 and 1-2 was "C: poor".

Here, the evaluation result of "A: excellent" refers to the case where both the peeling of the resist film and occurrence of cracks were "no", while the resistance value rising rate of the thin-film coil was 3.5% or less. The evaluation result of "B: good" refers to the case where the peeling of the resist film was "no" or "nearly no", the resistance value rising rate of the thin-film coil was 7.5% or less, and the occurrence of cracks was "no" or "some" (excluding the case where the evaluation result was A). The evaluation result of "C: poor" refers to the case where the peeling of the resist film was "yes", the resistance value rising rate of the thin-film coil was more than 7.5%, or the occurrence of cracks was "yes".

Example 2

The present invention will now be explained more specifically with reference to Examples 2-1 to 2-9 and Comparative Examples 2-1 and 2-2 and FIG. 12, but is not restricted to the following examples. FIG. 12 is a table showing embodied conditions and evaluation results of Examples 2-1 to 2-9 and Comparative Examples 2-1 and 2-2.

Example 2-1

The thin-film magnetic head 1 of Example 2-1 was obtained as in Example 1-1 except that the thickness $t_C$ of the maximum width part 46b in the laminating direction was set to 2.0 μm, while the thickness $t_R$ of the resist film 56 in the laminating direction was set to 2.0 μm, so that the ratio $t_C/t_R$ of the thickness $t_C$ of the maximum width part 46b in the first thin-film coil 46 in the laminating direction to the thickness $t_R$ of the resist film 56 in the laminating direction became 1.0.

Examples 2-2 to 2-9

The thin-film magnetic heads 1 of Examples 2-2 to 2-9 were obtained as in Example 2-1 except that X was set to 0.2, 0.3, 0.4, 0.5, 0.6, 0.7, 0.8, and 0.9, respectively.

Comparative Example 2-1

The thin-film magnetic head of Comparative Example 2-1 was obtained as in Example 2-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 2-2

The thin-film magnetic head of Comparative Example 2-2 was obtained as in Example 2-1 except that the whole upper face of the lead constituting the first thin-film coil was covered with the resist film (the whole upper face of the lead constituting the first thin-film coil was coated).

(Evaluation Results)

When the thin-film magnetic heads 1 of Examples 2-1 to 2-9 were cut at a predetermined plane and observed, the peeling of the resist film 56 was "no" or "nearly no". The resistance value rising rates of the thin-film coils in the thin-film magnetic heads 1 of Examples 2-1 to 2-9 were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 2-1 to 2-3, and "low" in the thin-film magnetic heads 1 of Examples 2-4 to 2-9. Further, when the thin-film magnetic heads 1 of Examples 2-1 to 2-9 were cut at a predetermined plane and observed, the occurrence of cracks was "no" in the vicinity of interfaces between the first thin-film coil 46, the insulating layer 50, and the resist film 56. In view of the foregoing, the evaluation result of the quality of the thin-film magnetic heads 1 in Examples 2-1 to 2-9 was either "A: excellent" or "B: good".

When the thin-film magnetic heads of Comparative Examples 2-1 and 2-2 were cut at a predetermined plane and observed, on the other hand, the peeling of the resist film was "no" in Comparative Example 2-1, and "yes" in Comparative Example 2-2. The resistance value rising rates of the thin-film coils in the thin-film magnetic heads of Comparative Examples 2-1 and 2-2 were measured and found to be 9.5 and 0.0, respectively. Namely, the resistance value rising rate of the thin-film coil was "high" in the thin-film magnetic head of Comparative Example 2-1, and "no" in the thin-film magnetic head of Comparative Example 2-2. Further, when the thin-film magnetic heads of Comparative Examples 2-1 and 2-2 were cut at a predetermined plane and observed, the occurrence of cracks was "no" in the vicinity of interfaces between the first thin-film coil, the insulating layer, and the resist film. In view of the foregoing, the evaluation result of the quality of the thin-film magnetic heads in Comparative Examples 2-1 and 2-2 was "C: poor".

Example 3

The present invention will now be explained more specifically with reference to Examples 3-1 to 3-9 and Comparative Examples 3-1 and 3-2 and FIG. 13, but is not restricted to the following examples. FIG. 13 is a table showing embodied conditions and evaluation results of Examples 3-1 to 3-9 and Comparative Examples 3-1 and 3-2.

Example 3-1

The thin-film magnetic head 1 of Example 3-1 was obtained as in Example 1-1 except that the thickness $t_C$ of the maximum width part 46b in the laminating direction was set to 2.0 μm, while the thickness $t_R$ of the resist film 56 in the laminating direction was set to 1.5 μm, so that the ratio $t_C/t_R$ of the thickness $t_C$ of the maximum width part 46b in the first thin-film coil 46 in the laminating direction to the thickness $t_R$ of the resist film 56 in the laminating direction became 4/3.

Examples 3-2 to 3-9

The thin-film magnetic heads 1 of Examples 3-2 to 3-9 were obtained as in Example 3-1 except that X was set to 0.2, 0.3, 0.4, 0.5, 0.6, 0.7, 0.8, and 0.9, respectively.

Comparative Example 3-1

The thin-film magnetic head of Comparative Example 3-1 was obtained as in Example 3-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 3-2

The thin-film magnetic head of Comparative Example 3-2 was obtained as in Example 3-1 except that the whole upper face of the lead constituting the first thin-film coil was covered with the resist film (the whole upper face of the lead constituting the first thin-film coil was coated).

(Evaluation Results)

Figure 19:
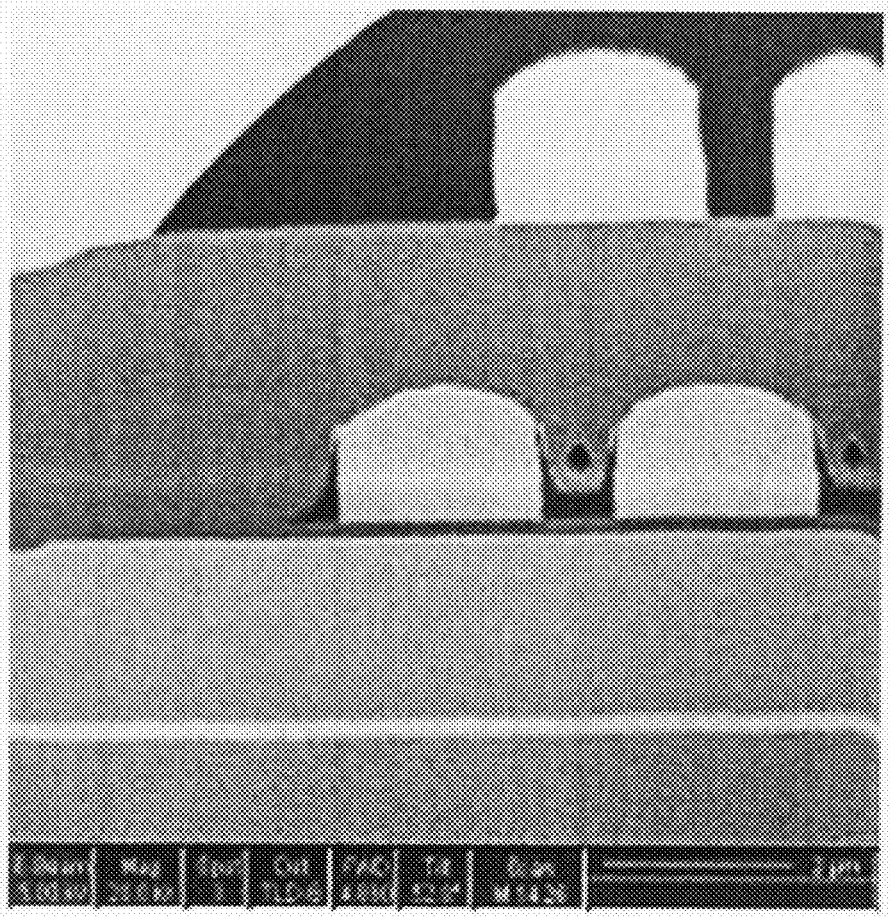
FIG. 19 is an optical micrograph showing how a crack occurs in a thin-film magnetic head as seen in a track width direction perpendicular to the medium-opposing surface as an example.

When the thin-film magnetic heads 1 of Examples 3-1 to 3-9 were cut at a predetermined plane and observed, the peeling of the resist film 56 was "no" or "nearly no". The resistance value rising rates of the thin-film coils in the thin-film magnetic heads 1 of Examples 3-1 to 3-9 were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 3-1 to 3-3, and "low" in the thin-film magnetic heads 1 of Examples 3-4 to 3-9. Further, when the thin-film magnetic heads 1 of Examples 3-1 to 3-9 were cut at a predetermined plane and observed, the occurrence of cracks was "some" in the vicinity of interfaces between the first thin-film coil 46, the insulating layer 50, and the resist film 56. FIG. 19 shows an optical micrograph of how a crack occurs in a thin-film magnetic head as seen in a track width direction perpendicular to the medium-opposing surface as an example. In view of the foregoing, the evaluation result of the quality of the thin-film magnetic heads 1 in Examples 3-1 to 3-9 was "B: good".

When the thin-film magnetic heads of Comparative Examples 3-1 and 3-2 were cut at a predetermined plane and observed, on the other hand, the peeling of the resist film was "no" in Comparative Example 3-1, and "yes" in Comparative Example 3-2. The resistance value rising rates of the thin-film coils in the thin-film magnetic heads of Comparative Examples 3-1 and 3-2 were measured and found to be 9.5 and 0.0, respectively. Namely, the resistance value rising rate of the thin-film coil was "high" in the thin-film magnetic head of Comparative Example 3-1, and "no" in the thin-film magnetic head of Comparative Example 3-2. Further, when the thin-film magnetic heads of Comparative Examples 3-1 and 3-2 were cut at a predetermined plane and observed, the occurrence of cracks was "some" in the vicinity of interfaces between the first thin-film coil, the insulating layer, and the resist film. In view of the foregoing, the evaluation result of the quality of the thin-film magnetic heads in Comparative Examples 3-1 and 3-2 was "C: poor".

Example 4

The present invention will now be explained more specifically with reference to Examples 4-1 to 4-9 and Comparative Examples 4-1 and 4-2 and FIG. 14, but is not restricted to the following examples. FIG. 14 is a table showing embodied conditions and evaluation results of Examples 4-1 to 4-9 and Comparative Examples 4-1 and 4-2.

Example 4-1

The thin-film magnetic head 1 of Example 4-1 was obtained as in Example 1-1 except that the thickness $t_C$ of the maximum width part 46b in the laminating direction was set to 2.0 µm, while the thickness $t_R$ of the resist film 56 in the laminating direction was set to 1.2 µm, so that the ratio $t_C/t_R$ of the thickness $t_C$ of the maximum width part 46b in the first thin-film coil 46 in the laminating direction to the thickness $t_R$ of the resist film 56 in the laminating direction became 5/3.

Examples 4-2 to 4-9

The thin-film magnetic heads 1 of Examples 4-2 to 4-9 were obtained as in Example 4-1 except that X was set to 0.2, 0.3, 0.4, 0.5, 0.6, 0.7, 0.8, and 0.9, respectively.

Comparative Example 4-1

The thin-film magnetic head of Comparative Example 4-1 was obtained as in Example 4-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 4-2

The thin-film magnetic head of Comparative Example 4-2 was obtained as in Example 4-1 except that the whole upper face of the lead constituting the first thin-film coil was covered with the resist film (the whole upper face of the lead constituting the first thin-film coil was coated).

(Evaluation Results)

When the thin-film magnetic heads 1 of Examples 4-1 to 4-9 were cut at a predetermined plane and observed, the peeling of the resist film 56 was "no". The resistance value rising rates of the thin-film coils in the thin-film magnetic heads 1 of Examples 4-1 to 4-9 were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 4-1 to 4-3, and "low" in the thin-film magnetic heads 1 of Examples 4-4 to 4-9. Further, when the thin-film magnetic heads 1 of Examples 4-1 to 4-9 were cut at a predetermined plane and observed, the occurrence of cracks was "some" in the vicinity of interfaces between the first thin-film coil 46, the insulating layer 50, and the resist film 56. In view of the foregoing, the evaluation result of the quality of the thin-film magnetic heads 1 in Examples 4-1 to 4-9 was "B: good".

When the thin-film magnetic heads of Comparative Examples 4-1 and 4-2 were cut at a predetermined plane and observed, on the other hand, the peeling of the resist film was "no" in Comparative Example 4-1, and "yes" in Comparative Example 4-2. The resistance value rising rates of the thin-film coils in the thin-film magnetic heads of Comparative Examples 4-1 and 4-2 were measured and found to be 9.5 and 0.0, respectively. Namely, the resistance value rising rate of the thin-film coil was "high" in the thin-film magnetic head of Comparative Example 4-1, and "no" in the thin-film magnetic head of Comparative Example 4-2. Further, when the thin-film magnetic heads of Comparative Examples 4-1 and 4-2 were cut at a predetermined plane and observed, the occurrence of cracks was "some" in the vicinity of interfaces between the first thin-film coil, the insulating layer, and the resist film. In view of the foregoing, the evaluation result of the quality of the thin-film magnetic heads in Comparative Examples 4-1 and 4-2 was "C: poor".

Example 5

The present invention will now be explained more specifically with reference to Examples 5-1 to 5-9 and Comparative Examples 5-1 and 5-2 and FIG. 15, but is not restricted to the following examples. FIG. 15 is a table showing embodied conditions and evaluation results of Examples 5-1 to 5-9 and Comparative Examples 5-1 and 5-2.

Example 5-1

The thin-film magnetic head 1 of Example 5-1 was obtained as in Example 1-1 except that the thickness $t_C$ of the maximum width part 46b in the laminating direction was set to 2.0 µm, while the thickness $t_R$ of the resist film 56 in the laminating direction was set to 2.9 µm, so that the ratio $t_C/t_R$ of the thickness $t_C$ of the maximum width part 46b in the first thin-film coil 46 in the laminating direction to the thickness $t_R$ of the resist film 56 in the laminating direction became 0.7.

Examples 5-2 to 5-9

The thin-film magnetic heads 1 of Examples 5-2 to 5-9 were obtained as in Example 5-1 except that X was set to 0.2, 0.3, 0.4, 0.5, 0.6, 0.7, 0.8, and 0.9, respectively.

Comparative Example 5-1

The thin-film magnetic head of Comparative Example 5-1 was obtained as in Example 5-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 5-2

The thin-film magnetic head of Comparative Example 5-2 was obtained as in Example 5-1 except that the whole upper face of the lead constituting the first thin-film coil was covered with the resist film (the whole upper face of the lead constituting the first thin-film coil was coated).

(Evaluation Results)

When the thin-film magnetic heads 1 of Examples 5-1 to 5-9 were cut at a predetermined plane and observed, the peeling of the resist film 56 was "no" or "nearly no". The resistance value rising rates of the thin-film coils in the thin-film magnetic heads 1 of Examples 5-1 to 5-9 were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 5-1 to 5-3, and "low" in the thin-film magnetic heads 1 of Examples 5-4 to 5-9. Further, when the thin-film magnetic heads 1 of Examples 5-1 to 5-9 were cut at a predetermined plane and observed, the occurrence of cracks was "no" in the vicinity of interfaces between the first thin-film coil 46, the insulating layer 50, and the resist film 56. In view of the foregoing, the evaluation result of the quality of the thin-film magnetic heads 1 in Examples 5-1 to 5-9 was "A: excellent" or "B: good".

When the thin-film magnetic heads of Comparative Examples 5-1 and 5-2 were cut at a predetermined plane and observed, on the other hand, the peeling of the resist film was "no" in Comparative Example 5-1, and "yes" in Comparative Example 5-2. The resistance value rising rates of the thin-film coils in the thin-film magnetic heads of Comparative Examples 5-1 and 5-2 were measured and found to be 9.5 and 0.0, respectively. Namely, the resistance value rising rate of the thin-film coil was "high" in the thin-film magnetic head of Comparative Example 5-1, and "no" in the thin-film magnetic head of Comparative Example 5-2. Further, when the thin-film magnetic heads of Comparative Examples 5-1 and 5-2 were cut at a predetermined plane and observed, the occurrence of cracks was "no" in the vicinity of interfaces between the first thin-film coil, the insulating layer, and the resist film. In view of the foregoing, the evaluation result of the quality of the thin-film magnetic heads in Comparative Examples 5-1 and 5-2 was "C: poor".

Example 6

The present invention will now be explained more specifically with reference to Examples 6-1 to 6-9 and Comparative Examples 6-1 and 6-2 and FIG. 16, but is not restricted to the following examples. FIG. 16 is a table showing embodied conditions and evaluation results of Examples 6-1 to 6-9 and Comparative Examples 6-1 and 6-2.

Example 6-1

The thin-film magnetic head 1 of Example 6-1 was obtained as in Example 1-1 except that the thickness $t_C$ of the maximum width part 46b in the laminating direction was set to 2.0 μm, while the thickness $t_R$ of the resist film 56 in the laminating direction was set to 2.35 μm, so that the ratio $t_C/t_R$ of the thickness $t_C$ of the maximum width part 46b in the first thin-film coil 46 in the laminating direction to the thickness $t_R$ of the resist film 56 in the laminating direction became 0.85.

Examples 6-2 to 6-9

The thin-film magnetic heads 1 of Examples 6-2 to 6-9 were obtained as in Example 6-1 except that X was set to 0.2, 0.3, 0.4, 0.5, 0.6, 0.7, 0.8, and 0.9, respectively.

Comparative Example 6-1

The thin-film magnetic head of Comparative Example 6-1 was obtained as in Example 6-1 except that the resist film was interposed only between turns of the lead constituting the first thin-film coil, so that the whole upper face of the lead constituting the first thin-film coil was free of the resist film (the whole upper face of the lead constituting the first thin-film coil was exposed).

Comparative Example 6-2

The thin-film magnetic head of Comparative Example 6-2 was obtained as in Example 6-1 except that the whole upper face of the lead constituting the first thin-film coil was covered with the resist film (the whole upper face of the lead constituting the first thin-film coil was coated).

(Evaluation Results)

When the thin-film magnetic heads 1 of Examples 6-1 to 6-9 were cut at a predetermined plane and observed, the peeling of the resist film 56 was "no" or "nearly no". The resistance value rising rates of the thin-film coils in the thin-film magnetic heads 1 of Examples 6-1 to 6-9 were measured and found to be 7.5, 6.0, 4.5, 3.5, 2.5, 2.0, 1.5, 0.8, and 0.3, respectively. Namely, the resistance value rising rate of the thin-film coil was "slightly high" in the thin-film magnetic heads 1 of Examples 6-1 to 6-3, and "low" in the thin-film magnetic heads 1 of Examples 6-4 to 6-9. Further, when the thin-film magnetic heads 1 of Examples 6-1 to 6-9 were cut at a predetermined plane and observed, the occurrence of cracks was "no" in the vicinity of interfaces between the first thin-film coil 46, the insulating layer 50, and the resist film 56. In view of the foregoing, the evaluation result of the quality of the thin-film magnetic heads 1 in Examples 6-1 to 6-9 was "A: excellent" or "B: good".

When the thin-film magnetic heads of Comparative Examples 6-1 and 6-2 were cut at a predetermined plane and observed, on the other hand, the peeling of the resist film was "no" in Comparative Example 6-1, and "yes" in Comparative Example 6-2. The resistance value rising rates of the thin-film coils in the thin-film magnetic heads of Comparative Examples 6-1 and 6-2 were measured and found to be 9.5 and 0.0, respectively. Namely, the resistance value rising rate of the thin-film coil was "high" in the thin-film magnetic head of Comparative Example 6-1, and "no" in the thin-film magnetic head of Comparative Example 6-2. Further, when the thin-film magnetic heads of Comparative Examples 6-1 and 6-2 were cut at a predetermined plane and observed, the occurrence of cracks was "no" in the vicinity of interfaces between the first thin-film coil, the insulating layer, and the resist film. In view of the foregoing, the evaluation result of the quality of the thin-film magnetic heads in Comparative Examples 6-1 and 6-2 was "C: poor".

Figure 20:
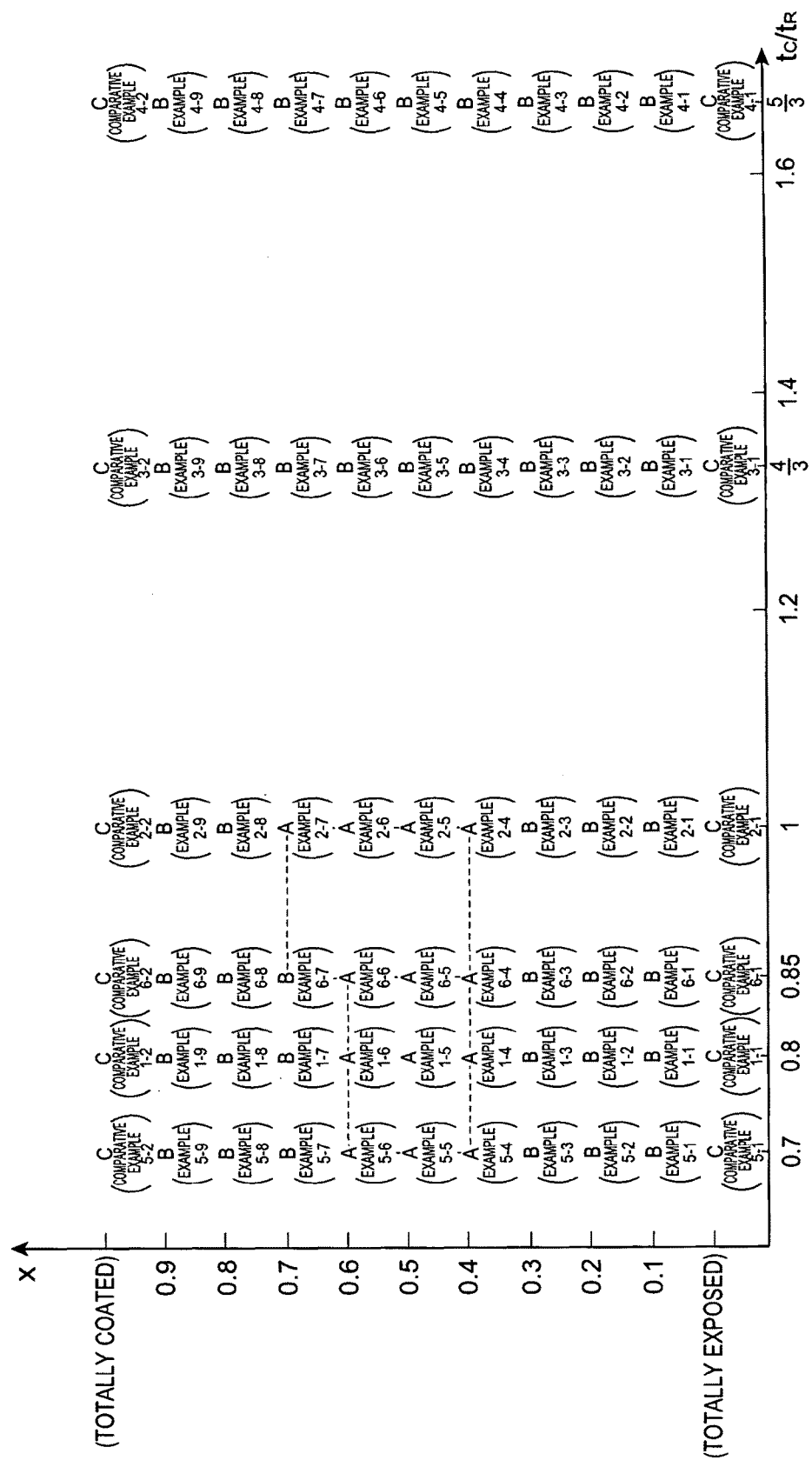
FIG. 20 is a chart showing the evaluation results of Examples 1 to 6, where the abscissa and ordinate are $t_C/t_R$ and X, respectively.

FIG. 20 summarizes the evaluation results of Examples 1 to 6 in the foregoing. FIG. 20 is a chart showing the evaluation results of Examples 1 to 6, where the abscissa and ordinate are $t_C/t_R$ and X, respectively. As shown in FIG. 20, the evaluation result was "A: excellent" when $0.7 \leq t_C/t_R \leq 0.85$ while $0.4 \leq X \leq 0.6$, and when $0.85 < t_C/t_R \leq 1.0$ while $0.4 \leq X \leq 0.7$.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thin-film magnetic head comprising a lower magnetic pole layer exposing an end part on a side of a medium-opposing surface opposing a recording medium, an upper magnetic pole layer opposing the end part of the lower magnetic pole layer such as to form a recording gap at one end part on the side of the medium-opposing surface and connecting with the lower magnetic pole layer at the other end part on a side remote from the medium-opposing surface, and a thin-film coil constituted by a lead wound about the other end part of the upper magnetic pole layer; the lower magnetic pole layer, the upper magnetic pole layer and the thin-film coil being laminated;

wherein an organic insulating material made of an electrically insulating organic matter is interposed between turns adjacent to each other in the lead constituting the thin-film coil;

wherein the lead constituting the thin-film coil has a minimum width part having the smallest width in the laminating direction and a maximum width part having the largest width in the laminating direction;

wherein the minimum width part of the lead is arranged closer to the medium-opposing surface than is the other end part of the upper magnetic pole layer;

wherein the maximum width part of the lead is arranged farther from the medium-opposing surface than is the other end part of the upper magnetic pole layer;

wherein the upper face of the minimum width part of the lead in the laminating direction is totally covered with the organic insulating material; and wherein the upper face of the maximum width part of the lead in the laminating direction is formed with an uncoated area free of the organic insulating material, the uncoated area being covered with an inorganic insulating material, wherein the lead constituting the thin-film coil further comprises lead conductors that are integrally formed with respective end parts of the lead constituting the thin-film coil and are separate from the minimum width part and the maximum width part.

2. A thin-film magnetic head according to claim 1, wherein the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead in the laminating direction falls within the range of $$0 < t_C/t_R \leq 1.0.$$

3. A thin-film magnetic head according to claim 1, wherein the lead constituting the thin-film coil further has a variable width part where the width of the lead in the laminating direction becomes smaller toward the medium-opposing surface;

wherein the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead falls within the range of $$0.85 < t_C/t_R \leq 1.0; \text{ and}$$

wherein the uncoated area is formed on the upper face in the laminating direction of a part where the width W of the lead in the laminating direction satisfies $$X \leq (W - W_{min})/(W_{max} - W_{min}) \leq 1.0$$

(where $W_{min}$ is the width of the lead in the minimum width part in the laminating direction, $W_{max}$ is the width of the lead in the maximum width part in the laminating direction, and X is a value falling within the range of $0.4 \leq X \leq 0.7$).

4. A thin-film magnetic head according to claim 1, wherein the lead constituting the thin-film coil further has a variable width part where the width of the lead in the laminating direction becomes smaller toward the medium-opposing surface;

wherein the maximum width part and the organic insulating material are constructed such that the ratio $t_C/t_R$ of the thickness $t_C$ of the maximum width part of the lead in the laminating direction to the thickness $t_R$ of the organic insulating material interposed between the turns adjacent to each other in the lead falls within the range of $$0.7 \leq t_C/t_R \leq 0.85; \text{ and}$$

wherein the uncoated area is formed on the upper face in the laminating direction of a part where the width W of the lead in the laminating direction satisfies $$X \leq (W - W_{min})/(W_{max} - W_{min}) \leq 1.0$$

(where $W_{min}$ is the width of the lead in the minimum width part in the laminating direction, $W_{max}$ is the width of the lead in the maximum width part in the laminating direction, and X is a value falling within the range of $0.4 \leq X \leq 0.6$).

5. A thin-film magnetic head according to claim 1, wherein the uncoated area is free of an edge part of the lead on the upper face side in the laminating direction; and wherein the organic insulating material is formed so as to extend to the edge part.

* * * * *